US011518242B2

(12) United States Patent
Myers et al.

(10) Patent No.: US 11,518,242 B2
(45) Date of Patent: Dec. 6, 2022

(54) SYSTEMS AND METHODS FOR LOCKING AN INPUT AREA ASSOCIATED WITH DETECTED TOUCH LOCATION IN A FORCE-BASED TOUCH DISPLAY

(71) Applicant: JOYSON SAFETY SYSTEMS ACQUISITION LLC, Auburn Hills, MI (US)

(72) Inventors: Kenneth Myers, Clarkston, MI (US); Nicholas Borgerding, Auburn Hills, MI (US); Jason Lisseman, Macomb, MI (US); David Andrews, Clarkston, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 17/489,171

(22) Filed: Sep. 29, 2021

(65) Prior Publication Data

US 2022/0097525 A1 Mar. 31, 2022

Related U.S. Application Data

(60) Provisional application No. 63/084,820, filed on Sep. 29, 2020.

(51) Int. Cl.
*G06F 3/041* (2006.01)
*B60K 35/00* (2006.01)

(52) U.S. Cl.
CPC ............ *B60K 35/00* (2013.01); *G06F 3/0412* (2013.01); *G06F 3/04146* (2019.05);
(Continued)

(58) Field of Classification Search
CPC ................ B60K 35/00; B60K 2370/11; B60K 2370/1434; B60K 2370/1472;
(Continued)

(56) References Cited

U.S. PATENT DOCUMENTS 9,513,707 B2 12/2016 Lisseman et al.
11,079,995 B1 * 8/2021 Hulbert ................. G06F 3/0485
(Continued)

FOREIGN PATENT DOCUMENTS

| CN | 109164950 B | 7/2020 |
| JP | 2018181322 A | 11/2018 |
| KR | 1020060125030 A | 12/2006 |

OTHER PUBLICATIONS

International Search Report and Written Opinion filed in International Application No. PCT/US2021/052635, dated Jan. 3, 2022, 11 pages.

*Primary Examiner* — Ibrahim A Khan
(74) *Attorney, Agent, or Firm* — Meunier Carlin & Curfman LLC

(57) ABSTRACT

In a touch screen environment, a computer calculates an effective position and updated effective positions of simultaneous or sequential touch events by calculating average coordinates of the touch events using force measurements. The average coordinates correspond to computerized maps of the user interface and z coordinates correspond to an average force at the x and y locations. The effective positions are used to determine if the user's touches move across multiple virtual input areas having priority and non-priority relationships. By expanding a virtual input area of the map for those areas having a priority label relative to a different non-priority virtual input area, the computer effectuates appropriate functions depending on where the most recent effective position lies.

20 Claims, 16 Drawing Sheets

(52) U.S. Cl.
CPC ... *B60K 2370/11* (2019.05); *B60K 2370/1434* (2019.05); *G06F 2203/04104* (2013.01); *G06F 2203/04105* (2013.01)

(58) Field of Classification Search
CPC . B60K 37/06; B60K 2370/139; G06F 3/0412; G06F 3/04146; G06F 2203/04104; G06F 2203/04105
See application file for complete search history.

(56) References Cited

U.S. PATENT DOCUMENTS

| | | | |
|---|---|---|---|
| 2012/0075212 A1* | 3/2012 | Park | G06F 3/04886 345/173 |
| 2013/0002560 A1 | 1/2013 | Chen et al. | |
| 2014/0160010 A1* | 6/2014 | Jung | G06F 3/04883 345/156 |
| 2014/0340338 A1* | 11/2014 | Kim | G06F 3/041 345/173 |
| 2015/0091859 A1* | 4/2015 | Rosenberg | G06F 3/03545 345/174 |
| 2015/0097794 A1* | 4/2015 | Lisseman | G06F 3/016 345/173 |
| 2015/0097796 A1* | 4/2015 | Lisseman | G06F 3/016 345/173 |
| 2015/0291032 A1* | 10/2015 | Kim | G06V 40/28 280/779 |
| 2016/0188181 A1* | 6/2016 | Smith | G06F 3/0412 715/765 |
| 2016/0357400 A1* | 12/2016 | Penha | G06F 3/04883 |
| 2017/0060343 A1 | 3/2017 | Trachte | |
| 2018/0335856 A1* | 11/2018 | Wolters | G06F 3/04845 |

\* cited by examiner

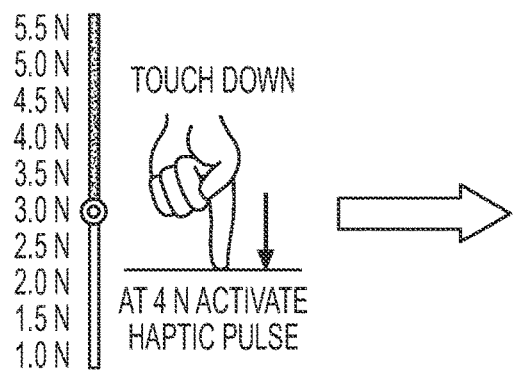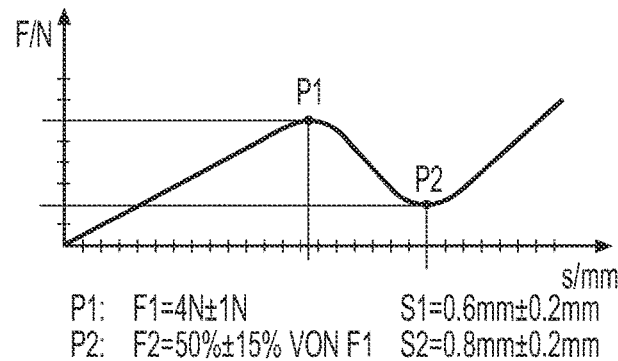
FIG. 8A
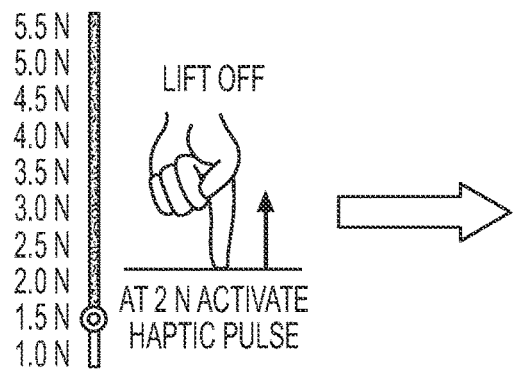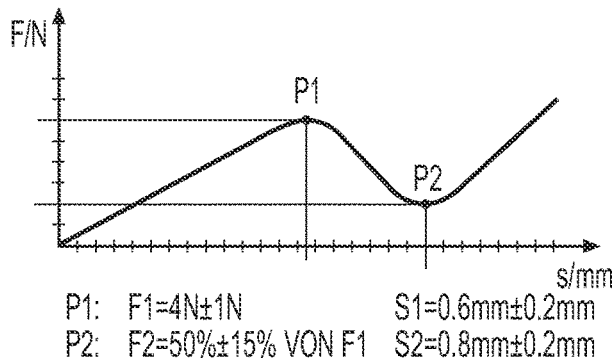
FIG. 8B

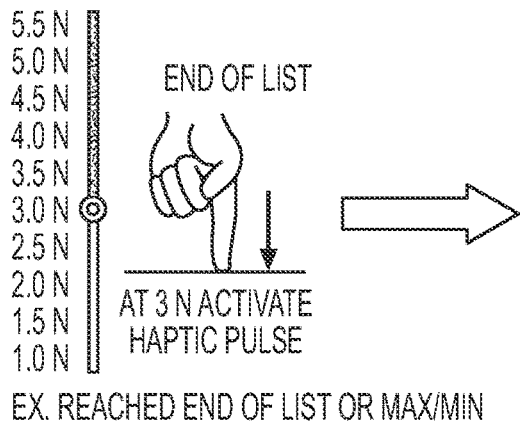
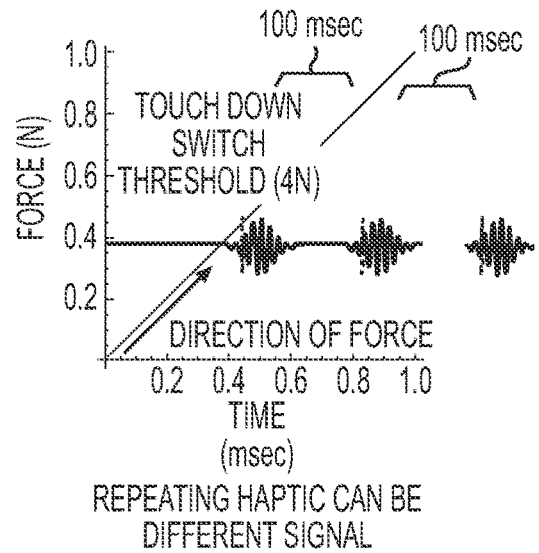
FIG. 8C
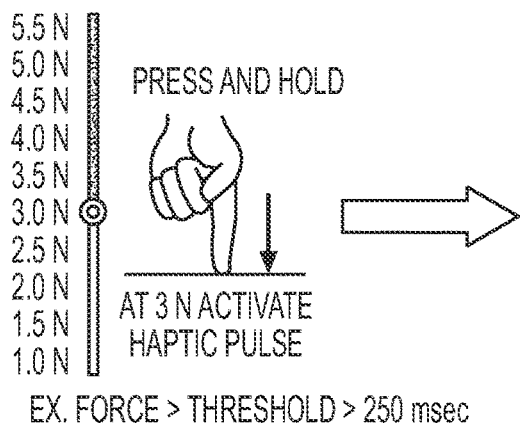
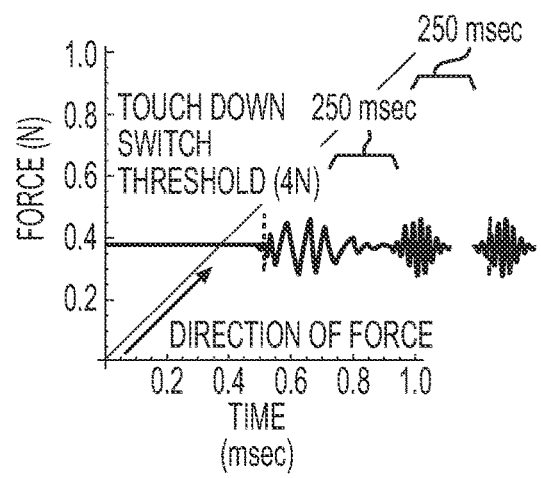
FIG. 8D

SYSTEMS AND METHODS FOR LOCKING AN INPUT AREA ASSOCIATED WITH DETECTED TOUCH LOCATION IN A FORCE-BASED TOUCH DISPLAY

CROSS-REFERENCE TO RELATED APPLICATION

This application claims priority to and incorporates by reference U.S. Provisional Patent Application Ser. No. 63/084,820 filed on Sep. 29, 2020, and entitled Systems and Methods for Locking an Input Area Associated with Detected Touch Location in a Force-Based Touch Display.

TECHNICAL FIELD

The present disclosure relates generally to a tactile switch panel and, more particularly, to systems and methods for locking the relative position of a detected touch location in a force-based tactile switch panel.

BACKGROUND

The recent widespread growth of feature-rich, relatively portable, and user-friendly consumer electronic devices has sparked a corresponding consumer demand for implementation of similar functionality in conventional appliances and devices. For example, more consumers are demanding modern touchscreen interfaces in appliances like televisions, refrigerators, dishwashers, and washing machines. Even modern thermostats are integrating gesture-controllable, fully-networked and remotely accessible user interfaces (UIs). For example, the automobile, often thought of as the quintessential utilitarian machine, has not been impervious to recent trends to incorporate as many options and features accessible to the driver as possible—from mechanical switch controls for climate, navigation, and radio systems integrated into the steering wheel, to touchscreen interfaces and camera displays integrated into the dashboard.

Although consumer demand for incorporating greater functionality into the automotive driving experience is growing rapidly, there are a number of problems with meeting such demand. First, conventional capacitive sense touchscreen technologies, such as those used in smartphones and tablet devices, while ideal for incorporating a large amount of functionality in a relatively limited space, require significant visual engagement by the driver and therefore require too long of a distraction time to be implemented safely. Second, while the conventional mechanical switches and knobs that are currently in use require reduced distraction time, they require the driver to remove his eyes from the road. These devices also tend to have limited flexibility, with each switch controlling a single function or feature.

One solution for combining the flexibility and versatility of touchscreen technologies, while still allowing the driver to remain attentive for safely operating the vehicle, involves the use of force-based haptic human-machine interfaces (HMIs). Force-based haptic HMIs typically include a sensor surface that is responsive to touch and an actuator for generating a responsive vibration (often simulating the response provided by a mechanical switch) that provides the driver with a tactile confirmation of an input on the touchscreen. These systems incorporate the haptic feedback that drivers have come to rely on in mechanical switches with the multi-touch, multifunction flexibility of touchscreen controls.

One problem with force-based haptic HMIs, particularly in automobiles and other mechanical systems, is that accidental or inadvertent touches are much more common than in conventional mechanical switches, due to the inability of the driver to continuously view the touch interface while driving. Indeed, in many situations, it may be hazardous for a driver to take his/her eyes off the road in order to visually engage an interactive touchscreen display for more than a couple of seconds, which may not be long enough to locate and select a user interface element associated with a desired switch function.

Furthermore, even if a desired user interface element is visually located, accidental or non-deliberate touch events may be problematic, particularly when the user is trying to activate a switch event while driving a moving vehicle. For example, a user's finger may initially touch a virtual input area to control a function associated with the switch that is located on the steering wheel. As the user breaks visual contact with the touch surface, the user may inadvertently begin to drag his/her finger across the touch surface, potentially resulting in an erroneous detection of a separate "touch" or "release" event. Such erroneous detections can lead to added operator distraction and frustration, possibly negating many of the benefits of a multi-function haptic touchscreen.

The presently disclosed systems and methods for locking an input area associated with detected touch location in a force-based button arrangement, including but not limited to touch screens associated with tactile switch panels, are directed to overcoming one or more of the problems set forth above and/or other problems in the art.

SUMMARY

In one embodiment, a computer, using a map of the touch panel, may utilize pre-programmed database entries or other electronic records to identify relationships between and among virtual input areas. Certain virtual input areas correspond to functions that have priority over other virtual areas, either for logical computing reasons or for safety reasons. The computer uses the effective position of multiple touches on a touch panel, along with previously determined priority relationships for multiple virtual input areas, and labels the determined virtual input area with a priority button label or a non-priority button label relative to other virtual input areas on the touch panel. For the priority button label, systems and methods of this disclosure use the computer to activate a respective function assigned to the determined virtual input area. The computer may be optionally programmed to ignore subsequent user interactions with other virtual input area(s) having a non-priority label until the respective function has been deactivated or completed. For effective positions of the touch, or touches, within virtual input areas having a non-priority button label, the system is configured to electronically, or virtually, lock a status of the determined virtual input area as active. Accordingly, the computer then updates a currently used version of the map of the user interface, stored in memory by expanding a related virtual input area having priority over the determined virtual input area. So long as the first user interaction with the touch panel provides the computer with a continuous force measurement, within a determined virtual input area, the computer and associated software continue to update the effective position of subsequent user interactions. Updating the effective position of the user interaction may be completed by calculating a series of coordinates in the virtual coordinate space using the force measurements, wherein the effective position moves within the map as the average of the coordinates changes with the force measurements. The computer calculates the effective position and an updated effective position by calculating average coordinates using the force measurements. If the effective position moves into the expanded virtual input area, the computer changes the status of the determined virtual input area, that was first touched, to a disabled status and locks an updated status of the expanded virtual input area, as active. If the effective position moves into the expanded virtual input area, the method and system change the status of the determined virtual input area to disabled and lock an updated status of the expanded virtual input area as active.

In another embodiment, for the priority button label, the system and methods further include ignoring subsequent user interactions with other virtual input area(s) having a non-priority label until the respective function has been deactivated or completed.

In another embodiment, the system and methods further include implementing a certain function associated with the active virtual input area.

In another embodiment, the system and methods further include updating the effective position of the user interaction by calculating a series of coordinates in the virtual coordinate space using the force measurements, wherein the effective position moves within the map as the average of the coordinates changes with the force measurements.

In another embodiment, the system and methods further include steps wherein the computer calculates the effective position and the updated effective position by calculating average coordinates using the force measurements.

In another embodiment, the system and methods further include steps wherein the average coordinates are x and y coordinates corresponding to the map of the user interface and z coordinates corresponding to an average force at the x and y locations.

In another embodiment, the system and methods further include steps wherein the continuous force measurement is above a threshold force value.

In another embodiment, a computer implemented method is disclosed for selecting an active input area associated with a force-based touch interface that is divided into virtual input areas stored on a map in a computer, the method includes detecting a first touch value associated with a first user interaction within a first virtual input area of a touch interface, the first touch value including information indicative of an x, y location and a force amount in a z-direction of the first user interaction. Next, the method steps include labeling the first virtual input area as a priority area or a non-priority area, and for a priority area, implementing a priority function and ignoring subsequent user interactions in corresponding non-priority areas. For a non-priority area, the method includes determining an associated priority area on the user interface and forming a virtually expanded priority area on the map of the user interface stored in the computer. So long as the first touch value has not been interrupted, for subsequent user interactions with the touch interface, the computer updates an effective position of cumulative user interactions with the user interface. So long as the effective position remains within a labeled non-priority area, the method continues by implementing an associated non-priority function. For any effective position within a labeled priority area, the computer disables the non-priority area and the associated non-priority function and locks the priority area and a priority function into an active status.

In another embodiment, the system and methods further include implementing a certain function associated with the active virtual input area.

In another embodiment, the system and methods further include updating the effective position of the user interaction by calculating a series of coordinates in the virtual coordinate space using the force measurements, wherein the effective position moves within the map as the average of the coordinates changes with the force measurements.

In another embodiment, the system and methods further include steps wherein the computer calculates the effective position and the updated effective position by calculating average coordinates using the force measurements.

In another embodiment, the system and methods further include steps wherein the average coordinates are x and y coordinates corresponding to the map of the user interface and z coordinates corresponding to an average force at the x and y locations.

In another embodiment, a computer implemented method for identifying a priority input from multiple inputs, applied simultaneously to a force-based touch interface, includes receiving a first touch value associated with a first user interaction with a first area of a force-based touch interface, the first touch value including information indicative of an x,y location within the first area of the touch interface and a force amount in a z-direction of the first user interaction. The method includes steps of checking a database stored on a computer to identify previously labeled priority or non-priority relationships between the first area and at least one additional area on the touch interface. The method continues by expanding any identified additional area having a priority label relative to the first area. This embodiment takes into account the computer receiving a second touch value associated with a second user interaction, in which the second touch value includes information indicative of an x,y location on the touch interface and a force amount in a z-direction of the second user interaction. The x,y location of the second user interaction with the touch interface may be spaced apart from the x,y location of the first area of the touch interface. In response to determining that the x,y location associated with the second touch value is within an expanded area having a priority label, and wherein the first touch value has not been interrupted, the method is configured for implementing a function associated with the expanded area having a priority label.

In another embodiment, the system and methods further include interrupting the first touch value comprises the user interaction with the touch interface being removed.

In another embodiment, the system and methods further include forming the map of the user interface by storing, in the computer, respective x, y coordinates of discrete locations forming the user interface and grouping the x, y coordinates to define a plurality of virtual input areas on the touch interface.

In another embodiment, the system and methods further include further comprising storing in a database priority and non-priority relationships between corresponding virtual input areas.

In another embodiment, the system and methods further include further comprising establishing priority and non-priority relationships between respective pairs of corresponding virtual input areas.

In another embodiment, the system and methods further include establishing a plurality of priority relationships with a single virtual input area.

In yet another embodiment, a computer implemented method for identifying a priority input from multiple inputs applied simultaneously to a force-based touch interface, a computer can be used to implement steps including receiving a first touch value associated with a first user interaction with a first area of a force-based touch interface, the first touch value including information indicative of an x,y location within the first area of the touch interface and a force amount in a z-direction of the first user interaction. The method continues by checking a database stored on a computer to identify previously labeled priority or non-priority relationships between the first area and at least one additional area on the touch interface and expanding any identified additional area having a priority label relative to the first area. The computer is then alerted to receiving a second touch value associated with a second user interaction, and the second touch value includes information indicative of an x,y location on the touch interface and a force amount in a z-direction of the second user interaction, wherein the x,y location of the second user interaction with the touch interface is spaced apart from the x,y location of the first area of the touch interface. In response to determining that the x,y location associated with the second touch value is within an expanded area having a priority label and the first touch value has not been interrupted, the computer may implement a function associated with the expanded area having a priority label.

In another embodiment, the system and methods further include steps wherein, in response to determining that the x, y location associated with the second touch value is either within the first area or within a different area not corresponding to a relationship in the database, then implementing a non-priority function associated with the first touch value.

BRIEF DESCRIPTION OF THE DRAWINGS

FIG. 8A provides a respective graph illustrating exemplary tactile feedback responses for one of several touch events (touch-down (e.g., engage))) associated with an exemplary multi-function tactile haptic switch panel, consistent with certain disclosed embodiments;

FIG. 8B provides a respective graph illustrating exemplary tactile feedback responses for one of several touch events (lift-off (e.g., release))) associated with an exemplary multi-function tactile haptic switch panel, consistent with certain disclosed embodiments;

FIG. 8C provides a respective graph illustrating exemplary tactile feedback responses for one of several touch events (e.g., end-of-list)) associated with an exemplary multi-function tactile haptic switch panel, consistent with certain disclosed embodiments;

FIG. 8D provides a respective graph illustrating exemplary tactile feedback responses for one of several touch events (e.g., press-and-hold) associated with an exemplary multi-function tactile haptic switch panel, consistent with certain disclosed embodiments;

DETAILED DESCRIPTION

In accordance with one aspect, the present disclosure is directed to a force-based switch panel that is configured to limit or lock the input area of a touch panel surface around an area associated with an initial touch detected at the surface. Accordingly, systems and methods consistent with the disclosed embodiments are configured to limit inadvertent or accidental touches by localizing the input area around a select touch area. In certain exemplary embodiments, areas or regions that are either not associated with initial touch area, or are subordinate to the initial touch area, may be disabled, ensuring that stray or accidental touch inputs are not registered as inputs to the touch panel.

Methods and systems consistent with the disclosed embodiments may be particularly applicable in situations in which distractions divert the user's visual attention to the touch interface. Indeed, in certain disclosed embodiments, the present disclosure is directed to switch panel user interfaces that provide multi-sensory confirmations of user interactions with the switch panel. In certain other embodiments, features consistent with the present disclosure provide a solution for limiting the functional detection area to a smaller, more localized area surrounding an initial touch event.

Figure 1:
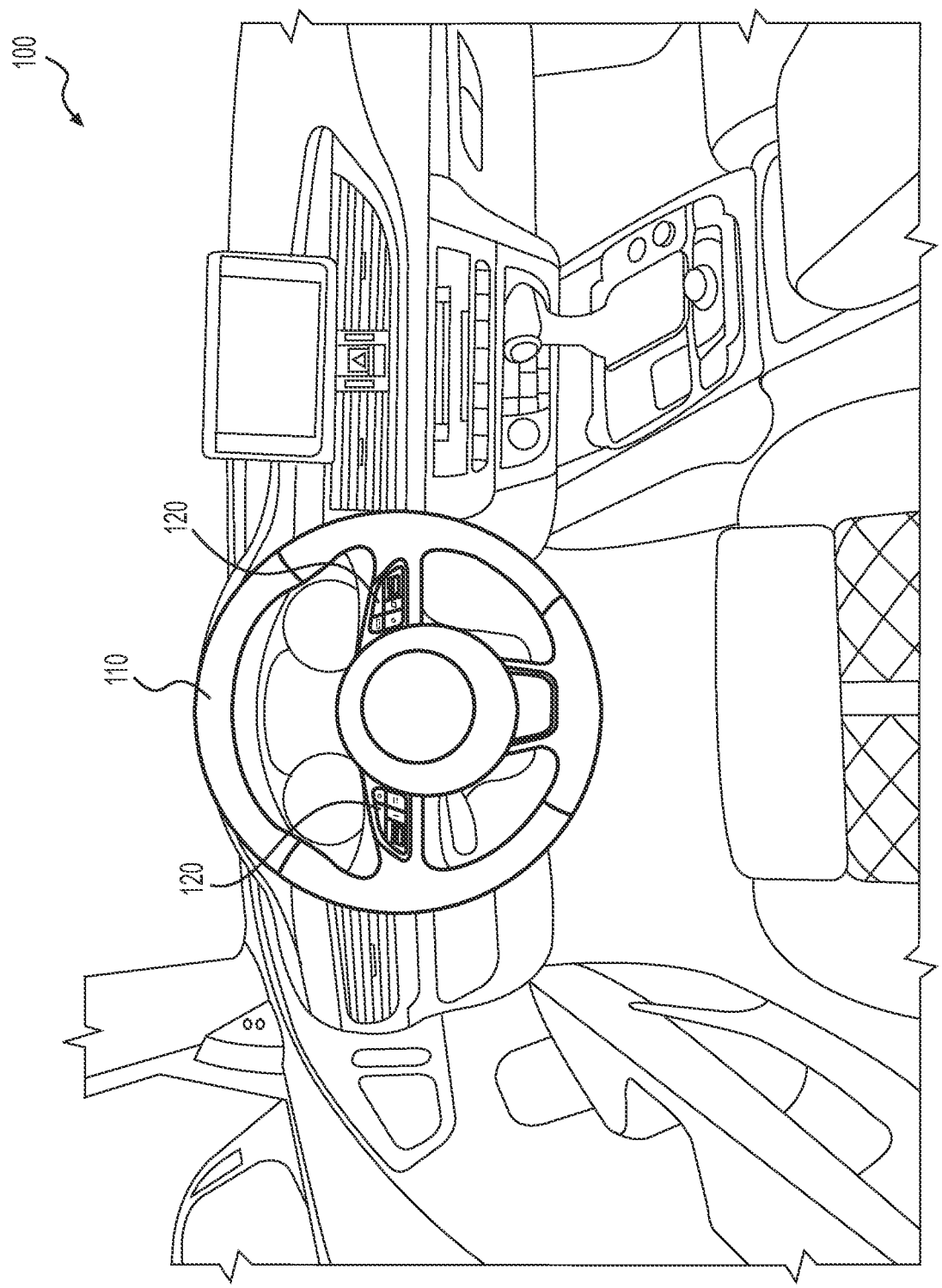
FIG. 1 illustrates an exemplary environment in which a switch panel, consistent with certain disclosed embodiments, may be implemented.

FIG. 1 illustrates an exemplary operational environment 100 in which features and methods associated with the disclosed multi-touch, multifunction switch panel may be implemented. According to one embodiment, and as illustrated in FIG. 1, operational environment 100 may include or embody a driver seat or cockpit associated with the vehicle, such as a ground-based motor vehicle. Alternatively or additionally, operational environment 100 may include or embody a driver console, or any occupant's switch panel, associated with any land, air, or sea-based transportation vehicle in which, such as a watercraft, aircraft, conventional motor vehicle, off-road vehicle, heavy construction machine, or any other type of vehicle. It is also contemplated that the presently disclosed embodiments may be employed in any stationary machine having a user console or interface, as a replacement for a conventional mechanical switch or button, such as, for example, in a vehicle training simulator, a video game console, or any other type of system that requires a human-machine interface.

FIG. 1 illustrates a plan view of an exemplary steering interface implementing a force-based switch panel (also referred to herein as a track pad interface) for vehicle control panels in accordance with the present disclosure. The example of a steering wheel is just one non-limiting example of a vehicle component or other structure on which the embodiments of the disclosure may be used. In the non-limiting example, a steering interface 110 can have a steering grip. A steering grip can be shaped in such a way to facilitate a driver's control of a vehicle when holding the steering grip. For example, the steering grip can include an annular ring shape with an outer contour that is essentially circular in shape. In an alternate implementation, the steering grip can define any suitable shape including, for example, circular, elliptical, square, rectangular, or any other regular or irregular shape. In an exemplary implementation, the steering grip can include a single continuous grip portion or any number of unique grip sections. Additionally the steering grip can be mounted on a fixed component such that it can be rotationally moved about a steering axis. An exemplary fixed component can include, for example, a steering column, which receives a steering spindle that extends along the steering column and serves to transmit the rotational movement of the steering grip to the wheels of the motor vehicle. Rotational movement of the steering grip may be transmitted to the wheels by mechanical and/or electrical means. In an exemplary implementation, the steering interface 110 can also include a one or more force-based tactile haptic switch panels 120, wherein each of the force-based switch panels 120 is operably coupled to the steering interface 110.

Coupling force-based switch panels 120 to the steering interface 110 provides a driver with a human-machine interface (HMI) that can be configured to detect a touch or force provided by a user and determine if a switch function should or should not be activated, for example. In one embodiment, the user can be provided with a tactile or audible feedback in response to the detected input.

Figure 2:
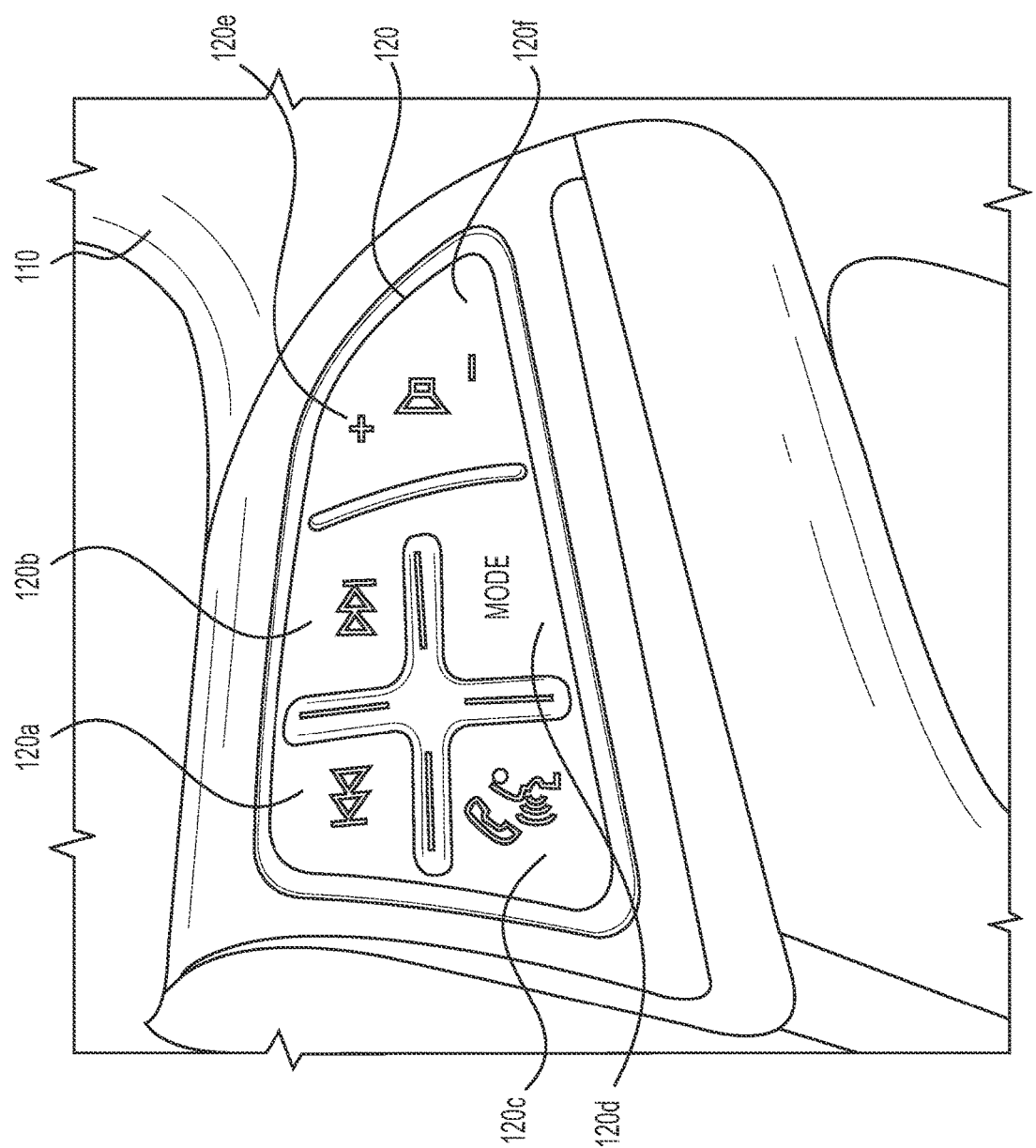
FIG. 2 illustrates an exemplary touch surface associated with a switch panel that is mounted within or upon a component within a vehicle, in accordance with certain disclosed embodiments.

FIG. 2 illustrates a zoom view of an exemplary steering interface 110 having embedded therein a force-based switch panel 120 consistent with certain disclosed embodiments. As illustrated in FIG. 2, the force-based switch panel 120 may be embedded within a spoke that couples the rim of steering interface 100 to the center column (not shown) of the steering interface. Force-based switch panel 120 be configured to provide an interface for user control of one or more functions or systems associated with the vehicle, without requiring the user to remove his/her hands from the steering interface 110. As shown in the exemplary embodiment in FIG. 2, force-based switch panel 120 may be configured to control the audio system, which may include radio(s), media player(s), hands-free voice control system, among others. Unlike conventional mechanical switches, force-based switch panel 120 is configured to detect force values applied by the user at various locations on the switch panel, and convert these force values to electrical commands for controlling vehicle functionality.

For example and without limiting the disclosure, as illustrated in FIG. 2, a first area of the force-based switch panel 120 may be configured to control a "track select" operation (e.g., a "fast-rewind" or "track-rewind" 120a operation or "fast-forward" or "track-forward" operation 120b) associated with an active media player operating in the vehicle. Alternatively or additionally, a second area of the force-based switch panel 120 may be configured to activate a voice control operation 120c associated with the vehicle media system (or Bluetooth voice activate device that may be connected to the vehicle media system). A third area of the force-based switch panel 120 may be configured to provide a "mode select" operation, whereby a vehicle operation may, for example, select an "active" media player from among a plurality of different media player(s) (e.g., terrestrial radio, satellite radio, CD player, DVD player, digital media player (e.g., MP3, etc.)) that may be equipped or activated on the vehicle. Finally, a fourth area of the force-based switch panel may be configured to provide the user with interface options to increase 120e or decrease 120f the volume associated with the active media player. The example of FIG. 2 includes just one area or component of a vehicle or other structure configured to utilize the embodiments of this disclosure.

Figure 3B:
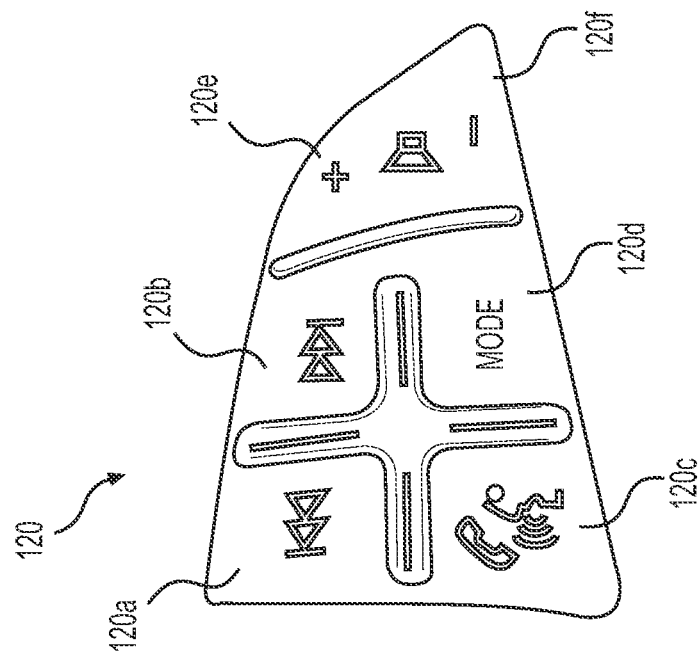
FIGS. 3A and 3B illustrate exemplary graphical layouts for one or more touch surfaces for a switch panel, consistent with certain disclosed embodiments.
Figure 3A:
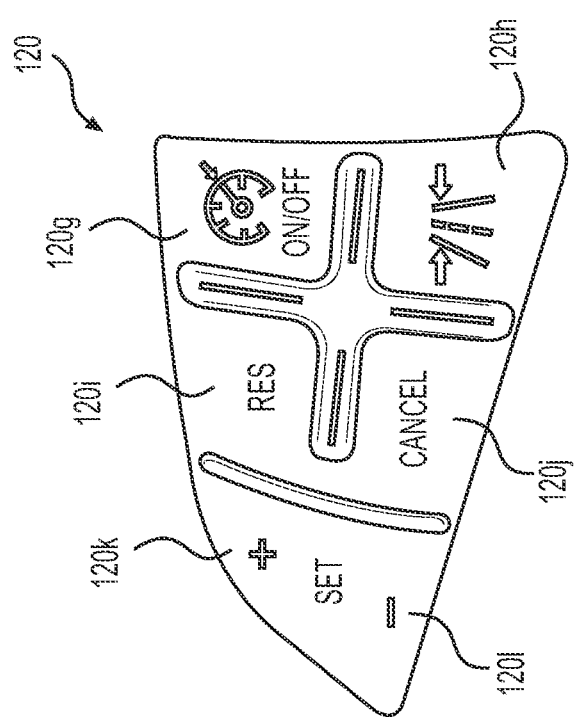

Those skilled in the art will recognize that one of the advantages of a force-based switch panel consistent with the disclosed embodiments is the flexibility of functionality that they provide. Specifically, by providing a relatively large touch sensitive area, particularly when compared with conventional mechanical switches which have a comparatively small functional footprint, the system can be customized to provide a large amount of functionality on the steering interface. Additionally, by providing haptic and audible feedback to the user in response to detection/recognition of the touch event, operator distraction is minimized. FIGS. 3A and 3B illustrate exemplary other example layouts for a force-based touch panel control system for a steering interface 110 that can control multiple different systems associated with the vehicle. It is within the scope of this disclosure that other components and structures, that are part of overall machines and appliances, may be configured to incorporate the touch panels described herein.

Although not shown in FIGS. 3A or 3B, it is contemplated that force-based touch panels 120 may be embedded in a component, such as but not limited to, the steering interface of a vehicle (as shown in FIG. 1), with FIG. 3A being disposed on a first portion of the steering interface 110 (such as on the left spoke of the steering interface 110) and FIG. 3B being disposed on a second portion of the steering interface 110 (such as on the right spoke of the steering interface 110). As explained above with respect to FIG. 2, FIG. 3B may embody a force-based switch panel 120 for controlling an audio system. As such, FIG. 3B will not be explained in further detail here.

FIG. 3A may include or embody a force-based switch panel 120 that is configured to provide the user with options for controlling certain automatic drive features (e.g., cruise control, automatic lane detection/warning system, etc.) associated with the vehicle. For example, as illustrated in FIG. 3A, a first area of force-based switch panel 120 may be configured to activate the cruise control function of the vehicle 120g. A second area of force-based switch panel 120 may be configured to set the cruise control speed (and subsequently increase 120k or decrease 120l the speed). Third and fourth areas of the force-based sensor 120 may be configured to resume 120*i* and cancel 120*j* cruise control functionality. Finally, a fifth area of the force-based switch panel 120 may be configured to control/enable/disable, the automatic lane detection and/or warning system of the vehicle.

It should be noted that, although FIGS. 3A and 3B illustrate certain exemplary configurations of force-based switch panels 120, such embodiments should not be construed as limiting. Indeed, other configurations of force-based switch panels 120 that may be used to control various other systems associated with a vehicle or any device configured for user interaction and may be implemented without departing from the scope of the present disclosure. In fact, the processes, methods, and system described in connection with the presently-disclosed force-based haptic switch panels 120 can be programmed to control most any functionality where a force-based detection-type user interface may be implemented. The configuration of the force-based switch panel 120 will be described in further detail below.

A force-based switch panel 120 can be any user interface device that includes a sensor configured to change at least one electrical property in response to a touch or force applied to a touch surface of the switch panel 120. A touch, also known as a touch event, can be for example a physical contact that occurs when a driver in a vehicle uses their hand (gloved or ungloved) to apply a force to force-based switch panel 120. A force-based switch panel 120, can be any suitable tactile sensor including, a mechanical sensor, a resistive sensor, a capacitive sensor, a magnetic sensor, an optical fiber sensor, a piezoelectric sensor, a silicon sensor, and/or a temperature sensor.

As will be explained in further detail below, the force-based switch panel 120 can include a two-dimensional array of force sensors, where each force sensor includes conductors and electrodes and is in at least partial contact with a touch surface positioned over the array. In one embodiment the force-based switch panel 120 can further comprise a base that is in at least partial contact with each of the force sensors. In one aspect, the base can comprise a printed circuit board. The touch interface passes touch forces to one or more force sensors of the array of force sensors. The touch interface can embody any touch-sensitive deformable member that can pass at least part of the forces from a user through the touch interface to one or more force sensors of the array of force sensors. In one embodiment, the touch interface can be used to provide haptic feedback to the user.

Figure 4:
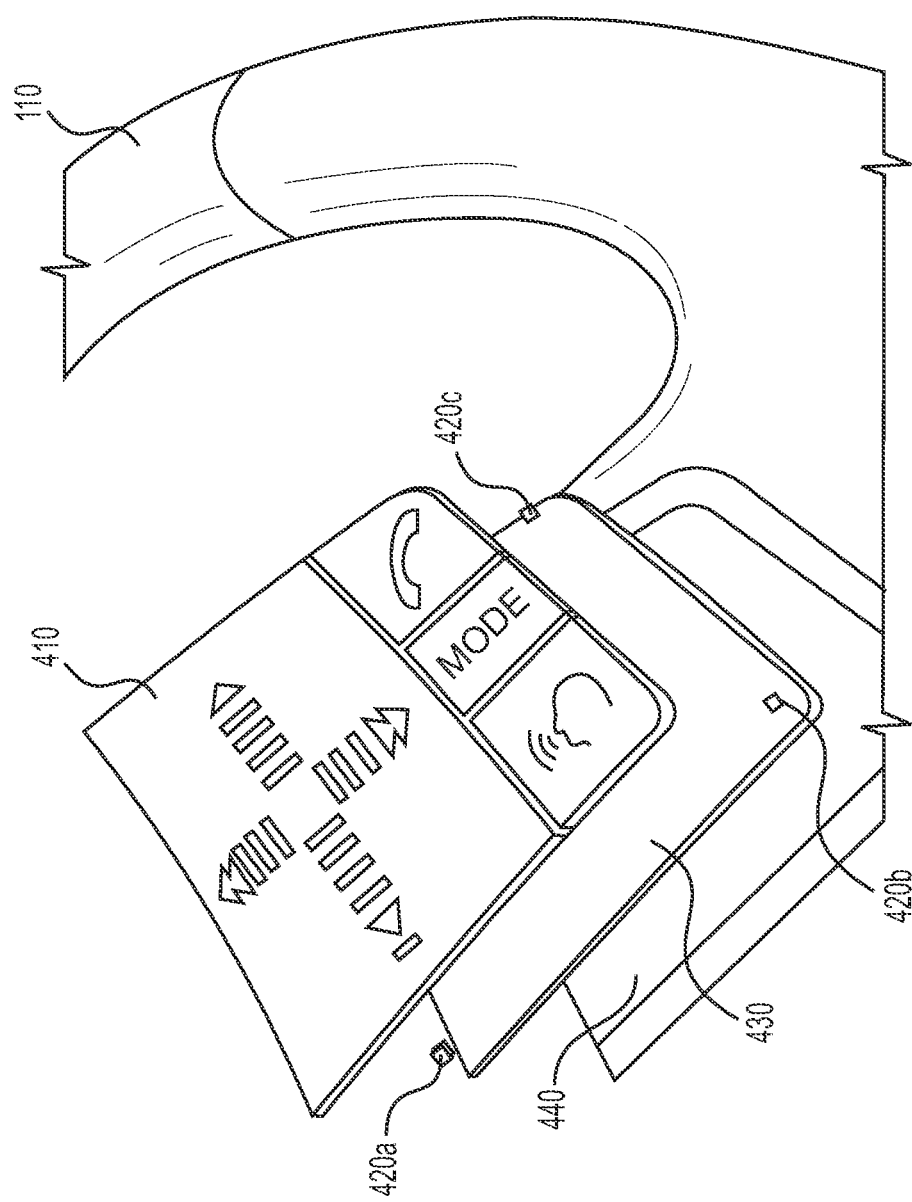
FIG. 4 provides a prospective exploded view of certain structural and functional layers of a switch panel, in accordance with certain disclosed embodiments.

For example, FIG. 4 provides a prospective exploded view showing certain components of a basic force-based switch panel 120 that is configured consistent with the disclosed embodiments. As illustrated in FIG. 4, force-based switch panel 120 may include a touch plate 410 having a touch surface, at least one force sensor 420*a*, 420*b*, 420*c*, operatively coupled to the touch plate and configured to detect a force applied to the touch surface, and a circuit board 430 disposed beneath the force sensor and configured to provide structural support for the force-based switch panel 120 and deliver electrical signals between the force sensors 420*a*, 420*b*, 420*c* and a corresponding processing device (e.g., controller) associated with the force-based switch panel 120. The force-based switch panel 120 may be configured for disposal within a housing 440 that can be situated within a corresponding void within steering interface 110. More detailed configurations of force-based switch panels consistent with the disclosed embodiments are illustrated in FIG. 5.

Figure 5:
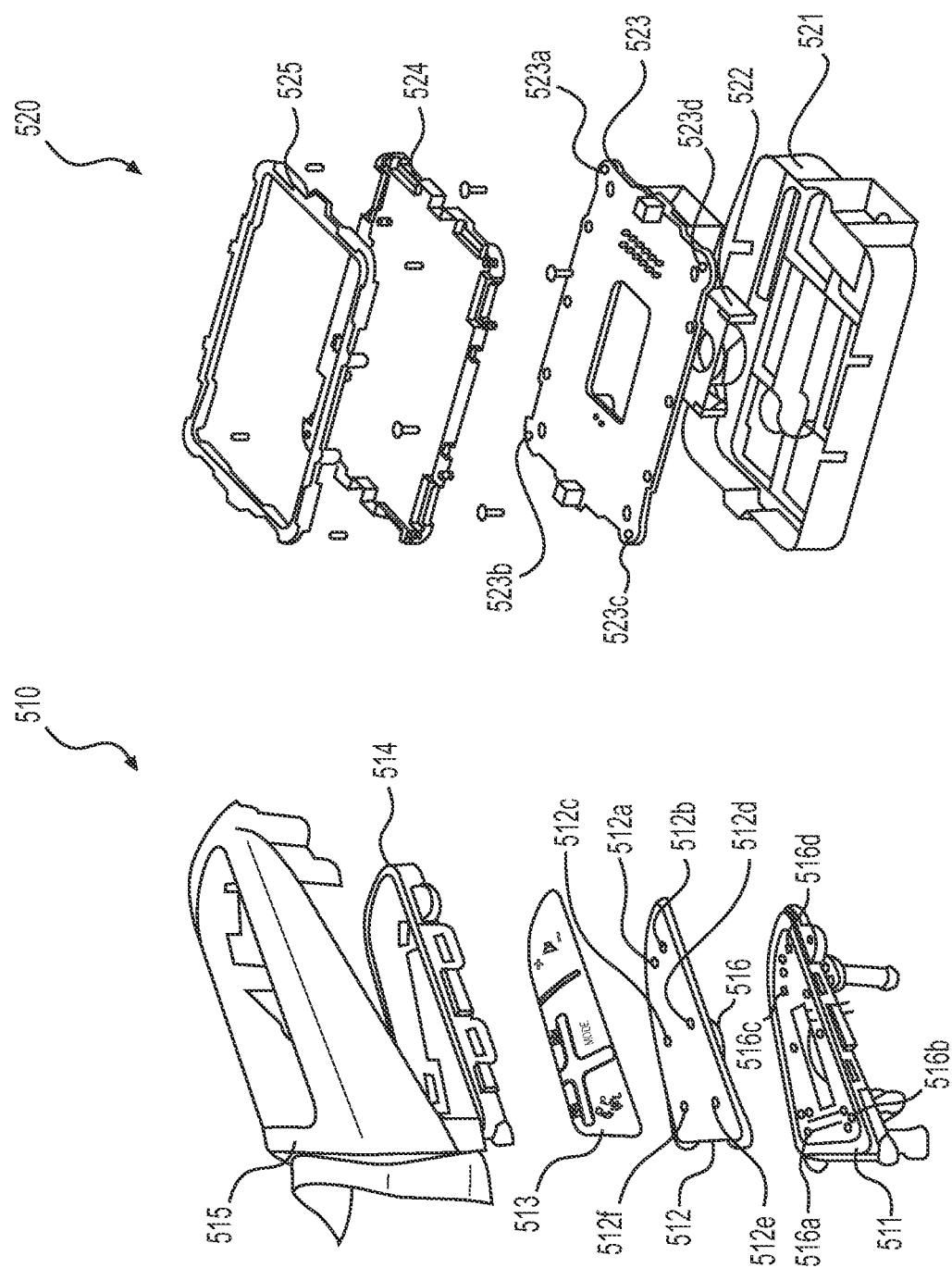
FIG. 5 provides alternative prospective exploded views of certain structural and functional layers of switch panel, in accordance with certain disclosed embodiments.

FIG. 5 illustrates cross-sectional, exploded views of alternate shapes and packaging methods embodiments of a force-based switch panel 120. On the left, an exemplary force-based switch panel 510 illustrated with packaging for implementing in a triangular shape steering interface 110 of a vehicle. On the right, an exemplary force-based switch panel 520 is illustrated with packaging for implementing in a rectangular shape steering interface 110 of a vehicle.

Both embodiments provide a force-based switch panel 510 (or 520) that includes a two-dimensional array of force sensors 516*a*-516*d* (or 523*a*-523*d*) arranged to have a geometric shape having a width and a length. For example, the array of force sensors 516*a*-516*d* (or 523*a*-523*d*) may have a width or length that is 8 mm or larger. In another example, the array of force sensors 516*a*-516*d* (or 523*a*-523*d*) may have a width or length that is less than 8 mm. In one embodiment, force-based switch panel 510 (or 520) can have a depth that is 0.5 mm or less. In another example, the force-based switch panel 510 (or 520) can have a depth that is greater than 0.5 mm. While the array of force sensors 523*a*-523*d* that is shown in the force-based switch panel 520 of FIG. 5 has a rectangular shape, it is to be appreciated that this is for illustrative purposes only and the two-dimensional array of force sensors can have shapes such as circular, oval, square, rectangular, triangular and irregular shapes (such as the array of force sensors 516*a*-516*d* of force-based switch panel 510 of FIG. 5).

Both of force-based switch panels 510, 520 shown in FIG. 5 comprise a touch interface plate 512 (or 524) positioned over the array of force sensors 516*a*-516*d* (or 523*a*-523*d*). The touch interface plate 512 (or 524) includes an upper surface and a lower surface that opposes the upper surface. The touch interface plate 512 (or 524) passes touch forces incident on the upper surface through to one or more force sensors 516*a*-516*d* (or 523*a*-523*d*) of the array of force sensors disposed adjacent the lower surface. According to some embodiments, such as that illustrated in connection with force-based switch panel 510, a "skin" 513 having a plurality of backlightable icons may be overlaid atop touch interface plate 512. In such embodiments, touch interface plate may include a plurality of transparent or translucent passages 512*a*-512*f* for light to from LEDs (now shown) to pass through, thereby lighting the backlightable icons of skin 512.

According to various implementations, the touch interface plate 512 (or 524) can embody any touch-sensitive deformable member that can pass at least part of the forces from a user through the touch interface plate 512 (or 524) to one or more force sensors 516*a*-516*d* (or 523*a*-523*d*) of the array of force sensors and allows light to pass through at least a portion of the interface plate 512 (or 524). For example, the touch interface plate 512 (or 524) can be comprised of polycarbonate (PC), acrylic, PC-acrylonitrile butadiene styrene (ABS), or other plastic material, glass, rubber, other suitable materials, or combinations thereof. According to certain implementations, the thickness of the material is selected to provide a low mass but provide sufficient thickness to allow light to pass through efficiently and provide sufficient coupling to the light source(s). The material should also be sufficiently stiff to withstand the forces being applied to the upper surface without too much distortion. For example, the thickness of the material for the touch interface plate may be at least about 0.2 mm. In some implementations, the thickness of the touch interface plate may be reduced (e.g., at least about 0.1 mm) when a light altering film is disposed on a surface thereof to assist with directing the light through the material and provide some structural stiffness.

Generally, the force sensors 516a-516d (or 523a-523d) are connected to or integrated with a lower housing 511 (or base surface 523). For example, the lower housing 511 (or base surface 523) may include a printed circuit board (PCB) used to electronically communicate information or power to and from the force sensors 516a-516d (or 523a-523d) in the form of electrical signals. In various embodiments, the lower housing 511 (or base surface or 523) can further include electronic circuit components such as resistors, capacitors, diodes, LEDs, transmitters, receivers, and the like, alone with electrical interconnects for connecting the various components together. And, in one embodiment, the lower housing 511 (or base surface or 523) includes the printed circuit board on which the processor (not shown in FIG. 5) is disposed, thus electrically connecting the force sensors 516a-516d (or 523a-523d) with the processor through the lower housing 511 (or base surface 523).

It is contemplated that additional and/or different components may be included as part of the force-based switch panel 510 (or 520). For example, force-based switch panel 510 (or 520) may include one or more components for packaging the touch interface plate 512 (or 524), one or more force sensors 516a-516d (or 523a-523d), lower housing 511 (or base surface 523), and feedback actuator 516 (or 522) together as part of a single user-interface component. In one embodiment, force-based switch panel 510 may include upper and lower housing components 515 and 511, respectively, for securing the force-based switch panel 510 within a hub of a steering interface 110. Alternatively, force-based switch panel 520 may include upper and lower housing components 525 and 521, respectively, for packaging the force-based switch panel 520 as part of a single user-interface input device.

Figure 6:
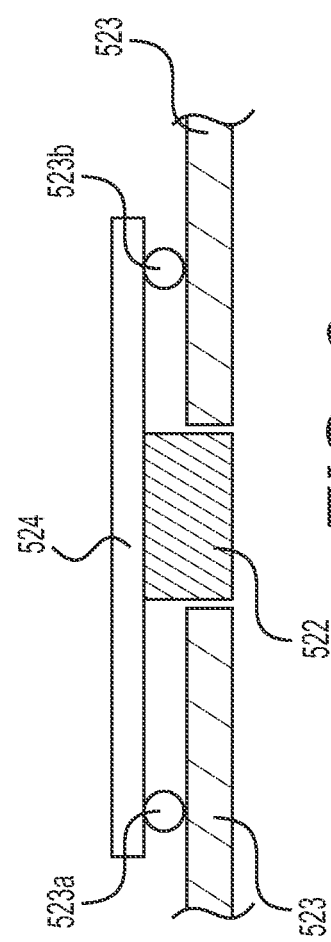
FIG. 6 provides a cross-sectional block diagram of certain exemplary components associated with a switch panel, consistent with certain disclosed embodiments.
Figure 7:
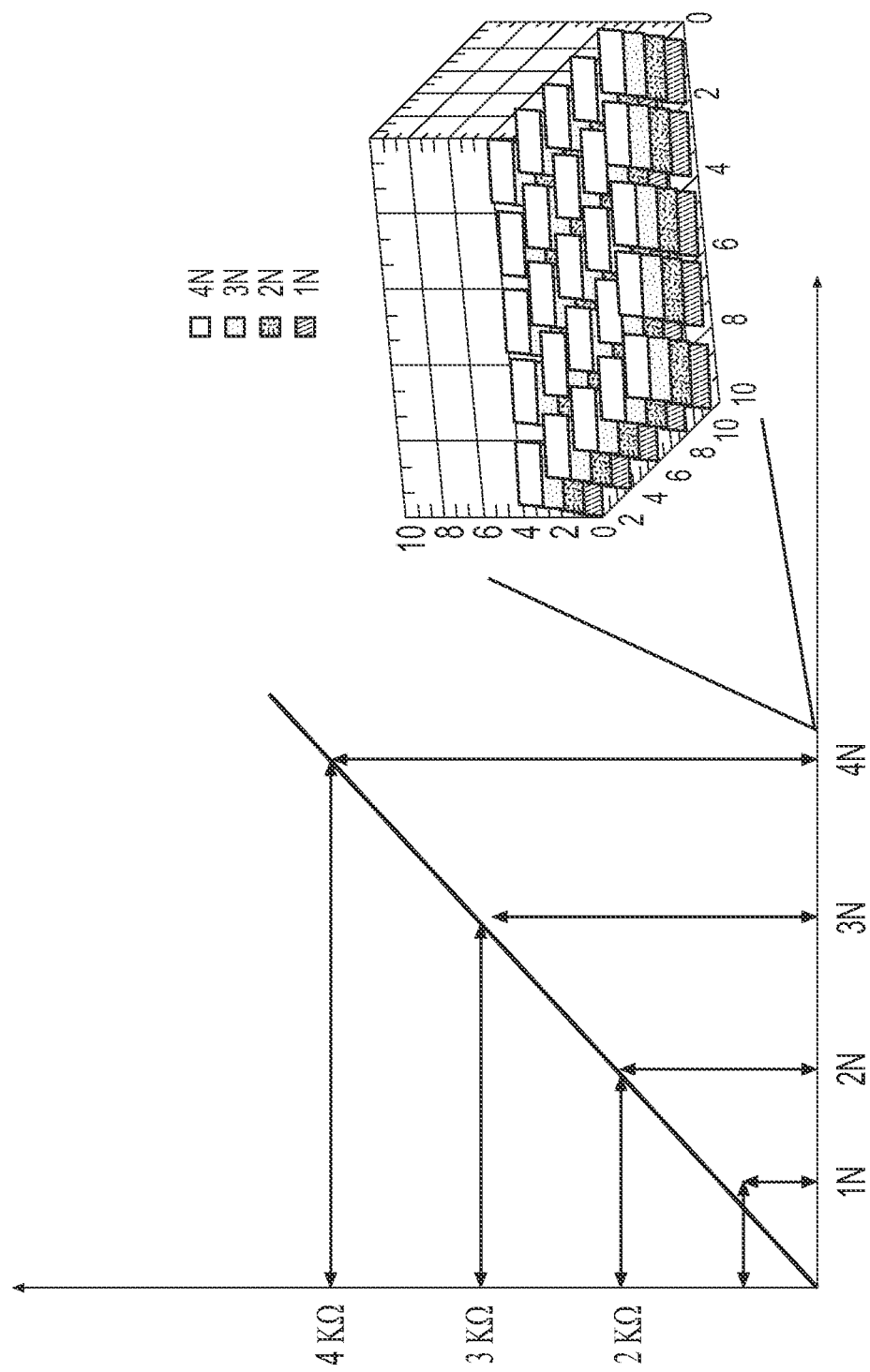
FIG. 7 provides graphs depicting exemplary force and location configuration values associated with a user interface layout for a multi-function switch panel, in accordance with certain disclosed embodiments.

In certain embodiments consistent with the present disclosure, the force-based switch panel may be constructed so as to provide other improvements to a user's experience with a touch panel, including but not limited to haptic and/or audible feedback in response to a detected input signal. FIG. 6 provides a cross-sectional diagram of certain example components associated with a force-based switch panel, consistent with certain disclosed embodiments. As illustrated in FIG. 6, the force-based switch panel may include a touch plate 524 having first (topside of touch plate 524) and second (underside of touch plate 524) surfaces. In this configuration, the first surface may embody a touch surface for receiving touch inputs from a user.

The force-based switch panel may also include a circuit board 523 having a plurality of force sensors 523a, 523b electrically coupled thereto. As shown in FIG. 6, the force sensors 523a, 523b may be disposed between the circuit board 523 and the second (e.g., underside) surface of the touch plate 524, such that each force sensor is configured to measure a corresponding portion of a force applied to the touch surface of the touch plate.

In non-limiting examples, the force-based haptic switch panel may include an actuator 522 that is affixed to the second (underside) surface of the touch plate 524. The actuator 522 may be configured to deliver a mechanical output to the touch plate. Non-limiting examples of mechanical outputs may include any mechanical output, such as a vibration, that may be delivered to a surface of the touch plate 524 and perceived by the user.

Actuator 522 may include or embody any suitable device for converting electrical energy to a mechanical output, including those that can be perceived by a user of force-based switch panel. Non-limiting examples of such actuators include acoustic actuators, rotational motors, vibrational actuators, piezoelectric resonators, linear resonant actuators, or eccentric rotating mass motors. IN certain embodiments, acoustic actuators may be used to provide both mechanical vibration and audible outputs simultaneously.

According to the embodiment illustrated in FIG. 6, the circuit board 523 may comprise a passage for allowing a portion of the actuator 522 to pass therethrough. Such a passage reduces the overall depth or thickness of the force-based switch panel while allowing the actuator to be mounted directly to the underside of the touch plate 524, increasing the amount of energy that is delivered to the touch plate. The actuator may be configured to deliver different levels of haptic feedback, based on the input provided by a processor or controller associated with the force-based switch panel.

Force-based switch panel 120 may also include a controller or processor-based computing system that is configured to receive values indicative of applied force from the force sensors and determine, based on the magnitude and location of the applied force (relative to the touch surface) which function of the vehicle that the user is trying to control. Indeed, force-based switch panel may include one or more hardware and/or software components configured to execute software programs.

Such a controller device may include one or more hardware components such as, for example, a central processing unit (CPU) or microprocessor, a random access memory (RAM) module, a read-only memory (ROM) module, a memory or data storage module, a database, one or more input/output (I/O) devices, and an interface. Alternatively and/or additionally, controller may include one or more software media components such as, for example, a computer-readable medium including computer-executable instructions for performing methods consistent with certain disclosed embodiments. It is contemplated that one or more of the hardware components listed above may be implemented using software. For example, storage may include a software partition associated with one or more other hardware components of controller. The controller may include additional, fewer, and/or different components than those listed above. It is understood that the components listed above are exemplary only and not intended to be limiting.

CPU may include one or more processors, each configured to execute instructions and process data to perform one or more functions associated with controller. CPU may be communicatively coupled to RAM, ROM, storage, database, I/O devices, and interface. CPU may be configured to execute sequences of computer program instructions to perform various processes, which will be described in detail below. The computer program instructions may be loaded into RAM for execution by CPU.

RAM and ROM may each include one or more devices for storing information associated with an operation of networking device and/or CPU. For example, ROM may include a memory device configured to access and store information associated with the controller, such as force threshold levels associated with the force-based switch panel. RAM may include a memory device for storing data associated with one or more operations of CPU. For example, ROM may load instructions into RAM for execution by CPU.

Storage may include any type of mass storage device configured to store information that CPU may need to perform processes consistent with the disclosed embodiments. For example, storage may include one or more magnetic and/or optical disk devices, such as hard drives, CD-ROMs, DVD-ROMs, or any other type of mass media device. Alternatively or additionally, storage may include flash memory mass media storage or other semiconductor-based storage medium.

Database may include one or more software and/or hardware components that cooperate to store, organize, sort, filter, and/or arrange data used by controller and/or CPU. CPU may access the information stored in database to in order to identify, for example, a particular function associated with a force input value. It is contemplated that database may store additional and/or different information than that listed above.

I/O devices may include one or more components configured to communicate information with a component or user associated with controller. For example, I/O devices may include a console with an integrated keyboard and mouse to allow a user to input parameters associated with the controller. I/O devices may also include a display including a graphical user interface (GUI) for providing a network management console for network administrators to configure networking device. I/O devices may also include peripheral devices such as, for example, a printer for printing information associated with networking device, a user-accessible disk drive (e.g., a USB port, a floppy, CD-ROM, or DVD-ROM drive, etc.) to allow a user to input data stored on a portable media device, a microphone, a speaker system, or any other suitable type of interface device. I/O devices may be configured to output network performance results.

Interface may include one or more components configured to transmit and receive data via a communication network, such as the Internet, a local area network, a workstation peer-to-peer network, a direct link network, a wireless network, or any other suitable communication platform. For example, interface may include one or more modulators, demodulators, multiplexers, demultiplexers, network communication devices, wireless devices, antennas, modems, and any other type of device configured to enable data communication via a communication network. According to one embodiment, interface may be coupled to or include wireless communication devices, such as a module or modules configured to transmit information wirelessly using Wi-Fi or Bluetooth wireless protocols.

As illustrated in FIGS. 7, 8A, 8B, and 8C, the force-based switch panel may be used to sense a position and magnitude of force applied to the force-based sensor system. In other words, the force-based sensor system may be configured to sense the position of the applied force in either one dimension (e.g., the X- or Y-direction) or two dimensions (e.g., the X- and Y-directions), as well of as the magnitude of the applied force (e.g., force in the Z-direction). The force-based sensor system can also be configured to sense the time that a force is applied at a particular location. In response to the magnitude, location, and/or duration of the applied force, certain optional embodiments utilize the force-based switch panel to generate a haptic and/or audible feedback signal responsive to the detected force. As shown in FIGS. 8A, 8B, and 8C, each touch event (e.g., touch-down, lift-off, and hold-down) may be initiated by a different user interaction (e.g., different force value and/or duration of the touch) and, accordingly, may trigger different haptic and/or audible output feedbacks being provided to the user.

Figure 9:
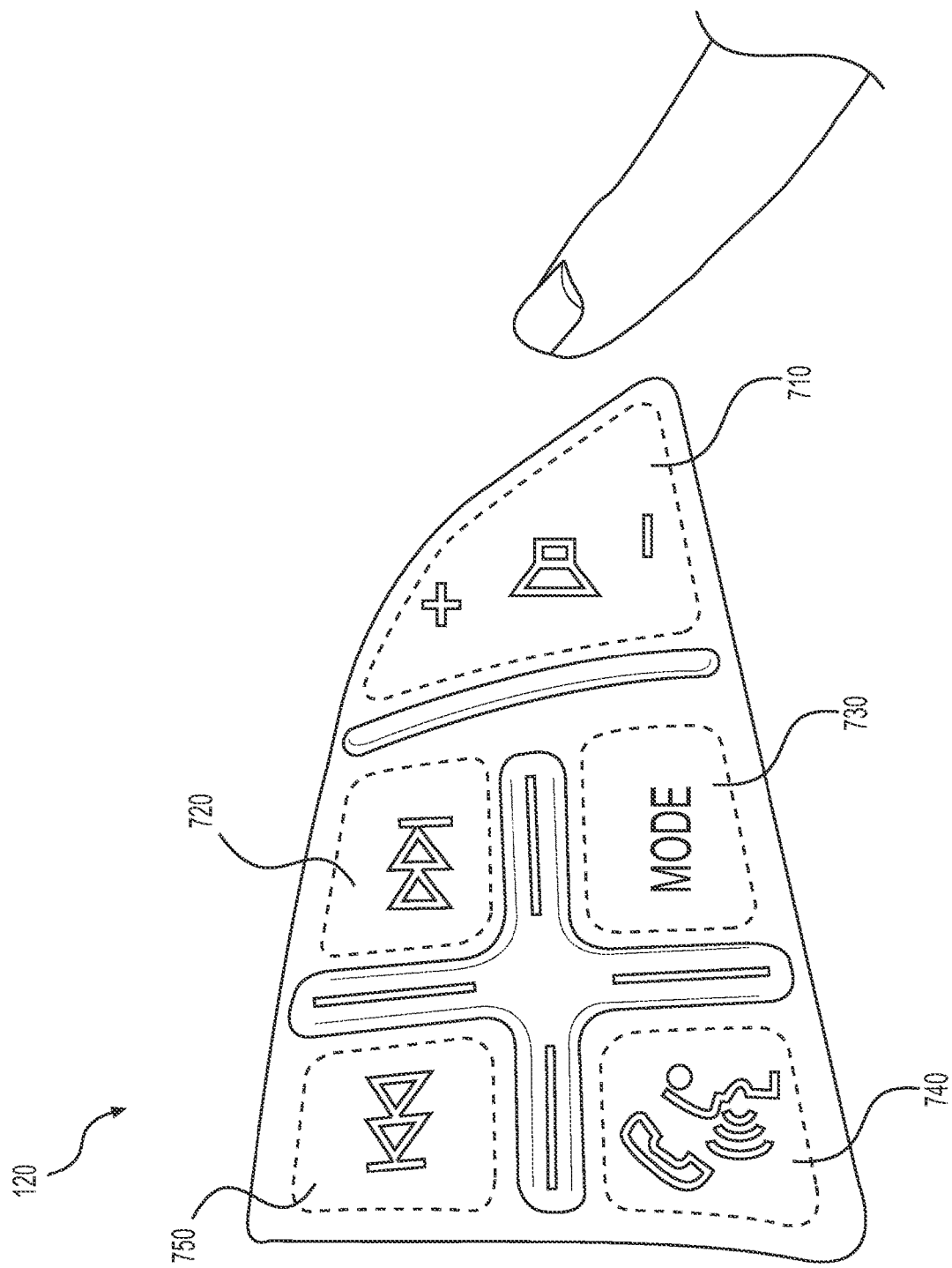
FIG. 9 illustrates an exemplary user-interface layout and corresponding virtual input area(s) as provided for in certain disclosed embodiments.
Figure 10:
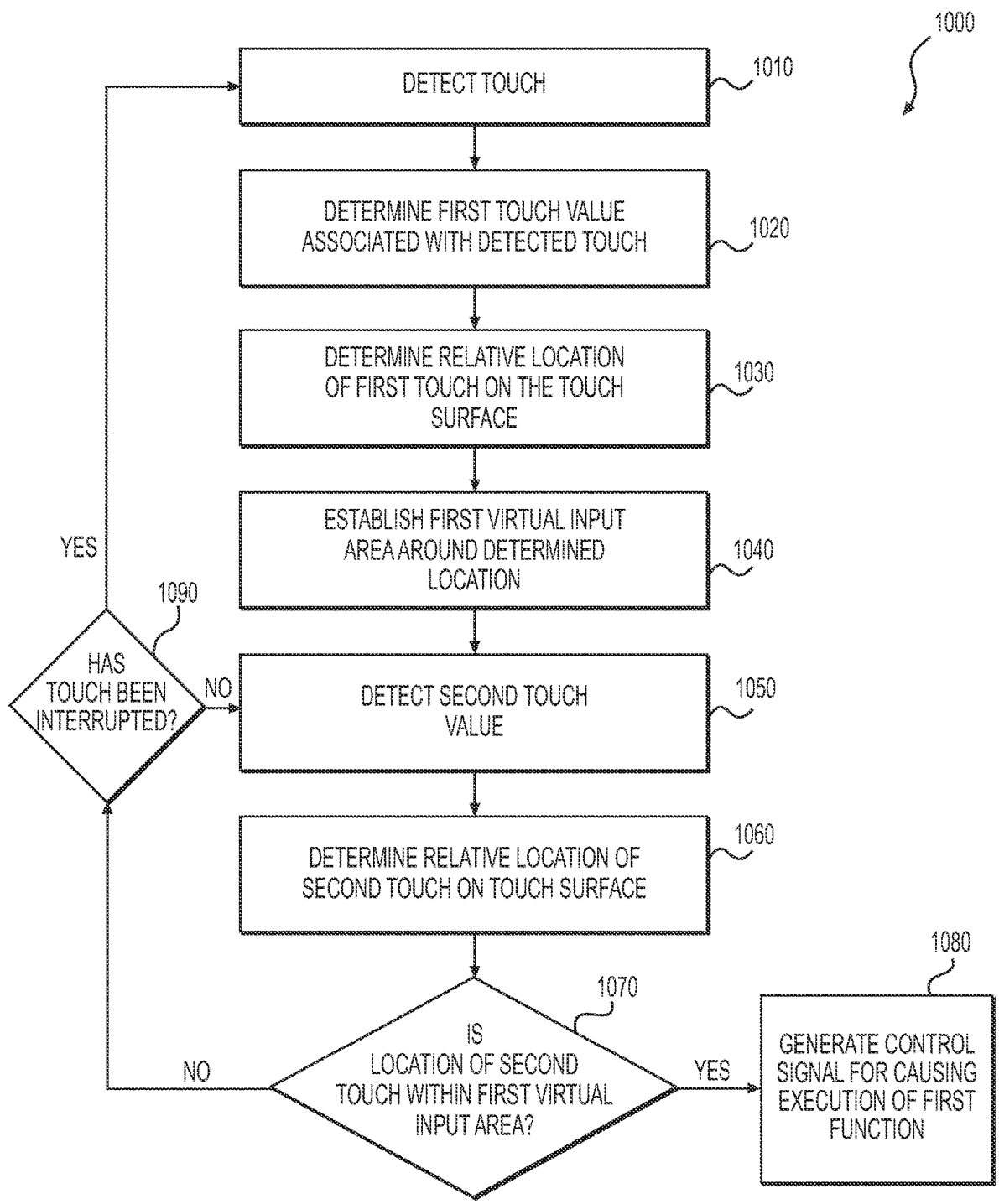
FIG. 10 provides a flowchart illustrating an exemplary process for locking an input area associated with a force-based touch interface consistent with the disclosed embodiments.

Systems and methods consistent with the disclosed embodiments provide a solution for detecting a location of a touch on the touch surface of the force-based switch panel 120 and limiting the effective user input area associated with the touch surface to a virtual area surrounding the location of the detected touch. As such, the presently disclosed embodiments are configured to minimize accidental touches that may be caused, for example, by situations in which a vehicle driver's attention is focused away from the touch surface of the force-based switch panel 120—such as when the driver properly has his/her eyes on the road. FIGS. 9 and 10 provide a diagram illustrating the establishment of virtual input areas that may be associated with the force-based switch panel 120 and a flowchart that illustrates an exemplary process for locking an input area associated with the force-based switch panel 120.

As illustrated in FIG. 9, a force-based switch panel may include a plurality of virtual input areas 710, 720, 730, 740, 750. Virtual input areas are designated as "virtual" because the boundaries of these areas are not necessarily physical, but, rather, are designated in computer-generated coordinate space. According to one embodiment, a virtual input area may be established as a designated, predetermined area surrounding one or more of the force-sensitive icons associated with the force-based switch panel 120. For example, one input area 710 may correspond with an area surrounding the "volume control" icon on a touch surface associated with a force-based switch panel 120. Other input areas may be designated around other individual inputs or groups of icons associated with the force-based switch panel such as, for example, an input area 720 surrounding the "fast-forward" or "track-forward" icon, an input area 730 surrounding the mode select icon, an input area 740 surrounding the voice activation icon, and/or an input area surrounding the "fast-rewind" or "track-rewind" icon. The input area(s), while corresponding to physical locations surrounding icons on the touch surface of force-based sensors, exist only in virtual (i.e., computer-generated) coordinate space and are designed to provide lateral boundaries by which force sensor(s) of the array of sensors that are underlying the touch surface may be selectively activated and/or deactivated.

As explained, the virtual area(s) are computer-generated coordinate locations that are associated with certain icons and/or locations on the surface of the touch panel of force-based switch panel 120. In other words, certain touch panels are not necessarily touch screens or other separate devices in a vehicle, but instead, touch panels may be designated areas that are consistent and/or integrated into a surface of any component in a vehicle. In some embodiments, the associations between the boundaries of the virtual area(s) and the icons/locations on the touch surface can be predetermined (i.e., they can be electronically programmed into the controller software prior to use by the user). In other embodiments, the associations between the boundaries of the virtual area(s) and the icons/locations on the touch surface can be established on an ad-hoc basis (i.e., after the user has initially contacted the touch surface) using boundaries and/or distance information that may be programmed in software. In certain embodiments, the virtual input area is configured to remain "activated" upon a user's initial contact with the touch surface until contact with the touch surface is interrupted (i.e., until a "lift-off" or "release").

Embodiments consistent with the present disclosure provide a solution for allowing the processor, associated with a force-based switch panel to lock the location data when a "switch-on" force threshold is met and maintained (or exceeded). Once the threshold is met, the location data is ignored or locked until the switch off threshold is met. This allows for a user's finger to move around due to vehicle vibration or other, without accidently activating a system. Having a switching system with the ability to distinguish the difference between intentional and unintentional activation, significantly reduces driver distraction. In other embodiments, location data is ignored until the switch on threshold is met. The location is read once the threshold is met, then updates to location are ignored until the switch off threshold is met and a new switch on threshold activation has occurred.

FIG. 10 provides a flowchart illustrating an exemplary process for locking an input area associated with a force-based touch interface consistent with the disclosed embodiments. The presently-disclosed process may be implemented by a processor associated with the force-based switch panel 120.

The process may commence upon detection of a touch at a touch surface of the force-based switch panel 120 (Block 1010). For example, a driver or user associated with the force-based switch panel 120 may identify an icon or other user interface element, such as one shown in FIG. 9, provided on a touch panel of a force-based switch panel 120. The user may press a touch surface of the touch panel with his/her finger, at which point a force sensor underlying the touch plate may detect the touch and register a force value associated with the detected touch.

Once a touch is detected, the touch value associated with the detected touch may be determined (Block 1020). According to one embodiment, the touch value may be determined by the processor coupled to the force sensor array underlying the touch plate. For example, the array of force sensors may each generate an output signal indicative of a force detected by the force sensor. The controller or processor that is coupled to the force sensor(s) may calculate a force value based on the plurality of force values received from each of the force sensor. The determined force value may be calculated in newtons, pounds, PSI, or any other appropriate unit that is indicative of applied force.

In addition to the force value, the processor may be configured to determine a relative location of the touch on the touch surface (Block 1030). For example, based on the touch values received from each of the force sensors, the controller or processor may calculate and estimate a geometric "center" of force of the detected touch. According to one embodiment, the estimation of the center of the force may be determined by performing a series of triangulation-type calculations based on the detected force values. For instance, the location may be determined as a relative distance based on the known locations of the force sensors that detected the largest force values among the array of force sensors. Alternatively or additionally, the estimated center of force may be less accurately estimated to correspond with the location of the force sensor that registered the largest touch value.

Once the force value and the location of the center of the force has been determined, a first virtual input area may be established around the determined location (Block 1040). As explained above with respect to FIG. 9, the virtual input area may be a predetermined area associated with the nearest icon to which the force was applied. In one embodiment, the processor may select the virtual input area by using the location of the center of the force to activate (or deactivate) force sensors surrounding the center of the location that are associated with virtual input area. For instance, the processor may determine that the center of location of the force is associated with a force sensor located beneath the volume control virtual input area (area 170 of FIG. 9). Processor may determine, using information stored in a database, for example, which other sensors of the sensor array are located in the area associated with the volume control input area 170. In some embodiments, the processor may establish the input area by effectively deactivating the sensors that are not designated as being associated with the volume control virtual input area 170 so that input values outside of the volume input area 170 are effectively ignored by the processor.

Once the virtual input area is established, a second touch value may be detected by the force-based switch panel 120 (Block 1050). Once detected, the processor may determine the relative location of the second touch on the touch surface (Block 1060), and determine whether the location of the second touch is within the established virtual input area (Block 1070). The processor may determine, by comparing the location of the center of force of the second touch and determine whether is associated with the one of the sensors associated with one of the "activated" sensors associated with the virtual input area. If the second touch value is determined as being within the boundary of the virtual input area (Block 1070: Yes), the processor may generate a control signal for causing execution of a first function (Block 1080).

If on the other hand, the processor determines that the location of the second touch exceeds the boundary of the established virtual input area (Block 1070: No), processor may ignore the touch value and determine whether the touch has been interrupted (Block 1090). If the touch has been interrupted (e.g., by the user lifting his finger from the initial touch, (Block 1090): Yes), the process may restart back (at Block 1010), with the second touch being established as the new touch. If, however, the processor determines that the first touch value has not been interrupted by, for example, the user having lifted his/her finger from the touch panel, the processor may determine that the second touch is unintentional and effectively ignore it, and proceed to Block 1050 to await a new touch value.

Considering FIGS. 11-14, as user interfaces 1100 in vehicles have become more sophisticated and somewhat crowded with control options for more and more systems, accidental touches and duplicate touches on a touch panel 120 are more common than ever before. The above described disclosure explains how one non-limiting system may process more than one touch 1120 on a touch panel 120 by ignoring additional touches outside a defined virtual input area; however, newer touch screens with more options require more sophisticated approaches. For example, more complex vehicle control algorithms may require better identification of locations for duplicate and simultaneous touches to correctly identify and enable certain advanced functions such as swipe controls, gesture inputs, and multi-button functions that utilize sequential user inputs via a touch panel 120. In fact, there may be scenarios when multiple touches may provide certain data points that are useful to modern vehicle control algorithms to implement proper functions and to ensure compliance with safety protocols. In these cases, the computers described above need to be able to detect multiple touches on a touch panel 120, either simultaneously or in a sequence, and calculate an effective position 1125 of the user's combined touch inputs, measured over a time period.

In non-limiting embodiments, the computer calculates the effective positions 1124, 1125 and the updated effective positions 1126, 1127 by calculating average coordinates using the force measurements. The average coordinates are x and y coordinates corresponding to a map of the user interface 1100 and z coordinates corresponding to an average force at the x and y locations. The methods and systems of this disclosure form the map of the user interface 1100 by storing, in the computer, respective x, y coordinates of discrete locations within the user interface and grouping the x, y coordinates to define a plurality of virtual input areas 1105A, 1105B, 1105C, 1105D, 1105E1, 1105E2 on the user interface 1100. The embodiments herein address these issues and provide additional uses for the above described triangulation procedures utilizing both positional data and force measurements from the touches. The system and methods herein may use the above described threshold force values to determine if a true touch has occurred that would be sufficient to begin the processes described herein. The effective position of the user interaction provides control systems with a number of options ensuring accuracy and safety in vehicle control.

In one non-limiting embodiment, a system for controlling a user interface 1100 on a touch panel 120 in a vehicle includes a computer 1210 having a processor 1230 and memory 1240 storing a map of the user interface 1100 in a virtual coordinate space. The effective position of the user interaction may be determined by calculating a series of coordinates in the virtual coordinate space using force measurements associated with user touch events, wherein the effective position moves within the map as the average of the coordinates changes with the force measurements.

The map divides the user interface 1100 into virtual input areas 1105A, 1105B, 1105C, 1105D, 1105E1 and 1105E2 corresponding to functions implemented by the computer 1210. A plurality of force sensors 420A, 420B, 420C described above and connected to the user interface 1100 are in electronic communication with the computer 1210 and transmit force measurements from forces applied to the user interface 1100 during a series of user interactions beginning with a first user interaction. In some implementations, the user interaction is a touch force 1120 on the touch panel 120. The memory stores computer implemented instructions performing steps programmed as software and, as noted above, uses the processor and the force measurements to calculate an effective position 1125 of a user interaction on the map (i.e., a digital or virtual map of the user interface stored in the memory and accessible by the computer). The effective position 1125 can then be used by the computer in determining the virtual input area 1105A, 1105B, 1105C, 1105D, 1105E1, 1105E2 in which the effective position 1125 lies (i.e., the "determined virtual input area" associated with the effective position 1125 of the cumulative or sequentially tracked touches).

In this embodiment, the computer, using the map of the touch panel, illustrated in the figures, may utilize pre-programmed database entries or other electronic records to identify relationships between and among virtual input areas. Certain virtual input areas 1105A, 1105B, 1105C, 1105D, 1105E1, 1105E2 correspond to functions that have priority over other virtual areas, either for logical computing reasons or for safety reasons during vehicle operation. For example, and without limiting this disclosure, a virtual input area 1105B, designated as a user interface for canceling cruise control, would have priority over a different virtual input area 1105E1 used to accelerate the vehicle. Similar relationships between multiple virtual input areas 1105A, 1105B, 1105C, 1105D, 1105E1, 1105E2 may be pre-programmed into control software stored in the memory of the computer (e.g., prioritizing selected combinations of virtual input areas illustrated by the dotted lines in FIGS. 11-14). In one embodiment, the computer uses the effective position 1125 of multiple touches on a touch panel 120, along with previously determined priority relationships for multiple virtual input areas, and labels the determined virtual input area with a priority button label or a non-priority button label relative to other virtual input areas on the touch panel. The computerized algorithm stores these label determinations in working memory.

In one embodiment, for the priority button label, systems and methods of this disclosure use the computer 1210 to activate a respective function assigned to the determined virtual input area. The computer 1210 may be optionally programmed to ignore subsequent user interactions with other virtual input area(s) having a non-priority label until the respective function has been deactivated or completed.

Figure 11:
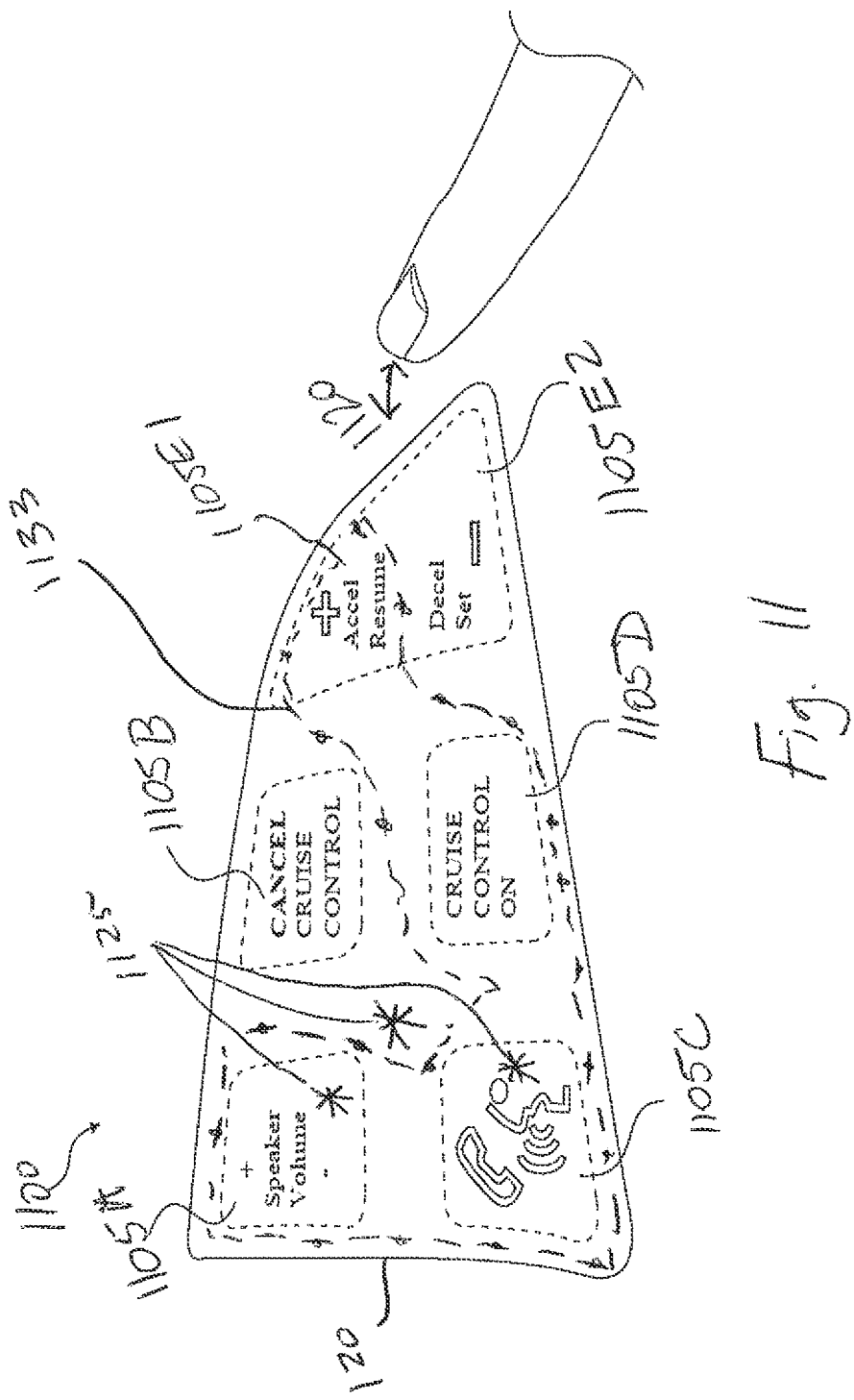
FIG. 11 illustrates an exemplary user-interface layout and corresponding virtual input area(s) as provided for in certain disclosed embodiments.

Taking virtual input area 1105E1 (accelerating a vehicle under cruise control) in FIG. 11 as a non-limiting example, the virtual input area 1105E1 for acceleration has priority over certain other virtual input areas. For effective positions 1125 of the touch, or touches 1120, within and between virtual input areas 1105A, 1105C, 1105D, the virtual touch area 1105E1 has priority and each of virtual input areas 1105A, 1105C, and 1105D have a non-priority button label stored in the computer memory relative to virtual input area 1105E1. In one embodiment, the system is configured to electronically, or virtually, lock a status of the determined virtual input area 1105E1 as active relative to non-priority functions 1105A, 1105C, 1105D. Accordingly, the computer then updates a currently used version of the map of the user interface 1100, stored in memory (such as a working copy of the master map), by recording related virtual input areas within region 1133 as non-priority inputs over the determined virtual input area 1105E1.

Figure 12:
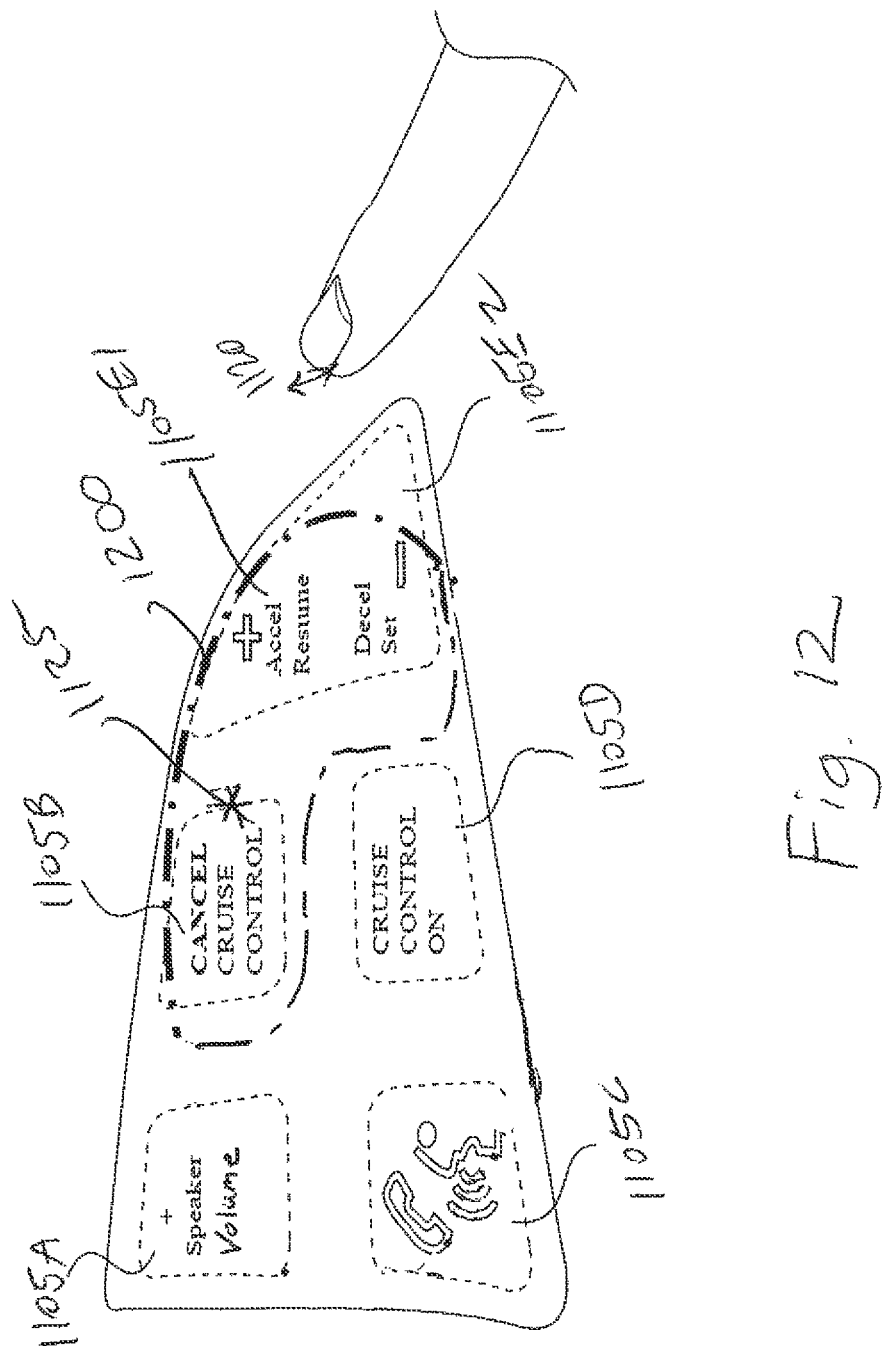
FIG. 12 illustrates an exemplary user-interface layout and corresponding virtual input area(s) as provided for in certain disclosed embodiments.

FIG. 12 shows a different perspective of a user interaction intended to accelerate the vehicle via virtual input area 1105E1. It is notable that in this non-limiting example, a priority relationship provides a different functionality. Virtual input area 1105B, for canceling cruise control, would have a priority relationship over the virtual input area 1105E1. Any touch indicating that the user needs to turn off cruise control would override a prior touch indicating acceleration at virtual input area 1105E1. In this case, the acceleration touch area, i.e., virtual input area 1105E1, has a non-priority label stored in computerized memory relative to virtual input area 1105B for turning cruise control off. FIG. 12 illustrates a non-limiting example for handling this set-up.

Considering the acceleration virtual touch area, 1105E1 as having the non-priority label relative to 1105B for canceling cruise control, a user touching the area 1105E1 may lock a status of the determined virtual input area 1105E1 as active. The computer then updates the stored virtual working map of the user interface 1100 by expanding a related virtual input area 1105B having priority over the determined virtual input area 1105E1. The expanded virtual input area 1200 may take any shape that is programmed into the software, with the goal being to track the effective position 1125 across the user interface. So long as the first user interaction, e.g., a touch at virtual input area 1105E1, registers a continuous force measurement that meets a force threshold, the computer continually updates the effective position 1125 of subsequent user interactions with the user interface. As shown by the expanded area 1200 for the priority virtual input area 1105B, if the effective position 1125 moves into the expanded virtual input area 1200, the computerized operation of this embodiment changes the status of the determined virtual input area (1105E1 for acceleration in this example) to disabled and locks an updated status of the expanded virtual input area 1200 as active. The end result is that the acceleration operation is deactivated, and the cancel cruise control function is activated, if simultaneous or subsequent user inputs 1120 register in the expanded virtual input area 1200. In other words, the user interactions that are available on the touch panel 120, within related virtual input areas 1105B and 1105E1, may be changed and tailored to account for priority relationships between and among various subsets of all of the virtual input areas.

Figure 13:
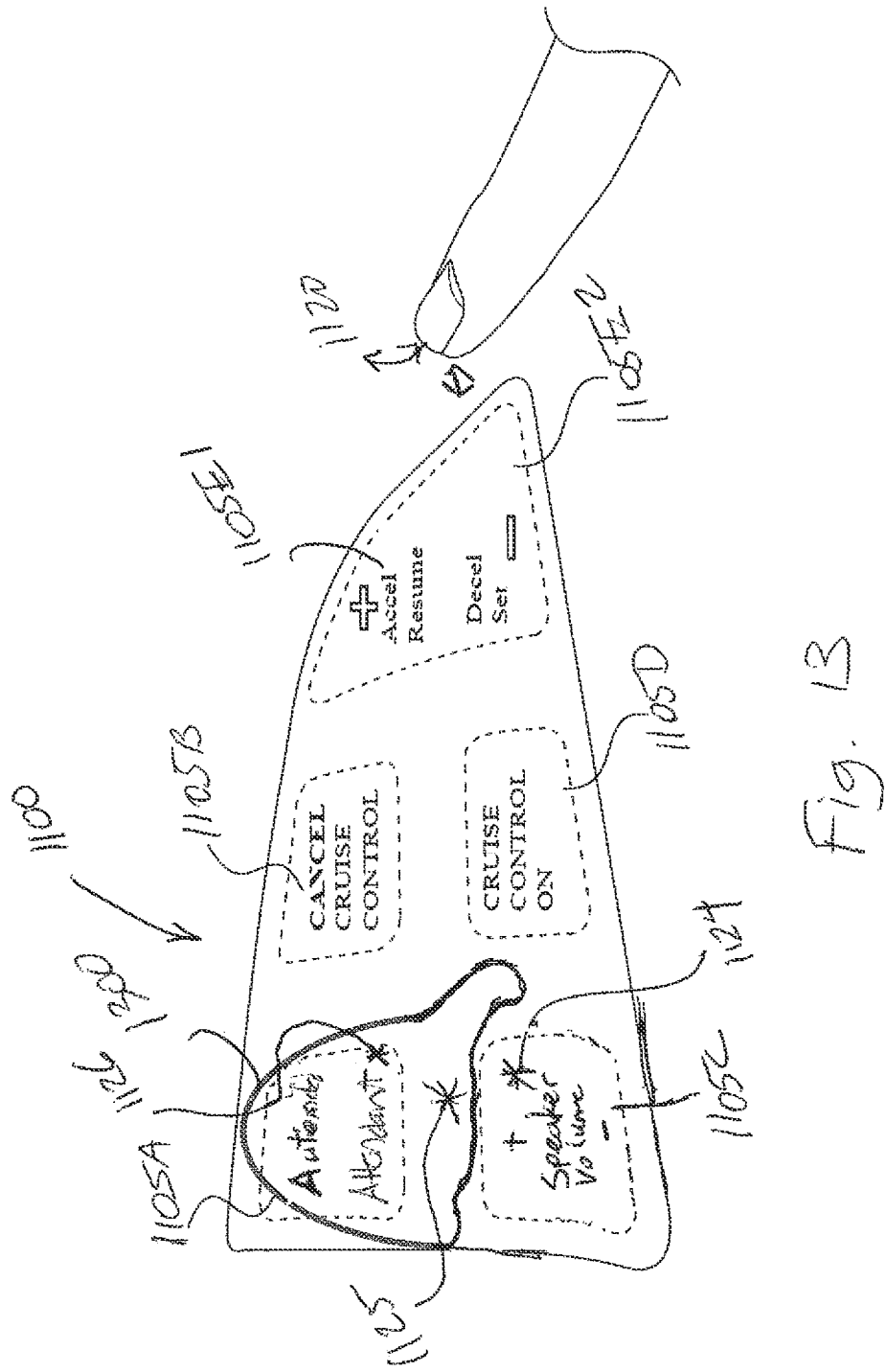
FIG. 13 illustrates an exemplary user-interface layout and corresponding virtual input area(s) as provided for in certain disclosed embodiments.
Figure 14:
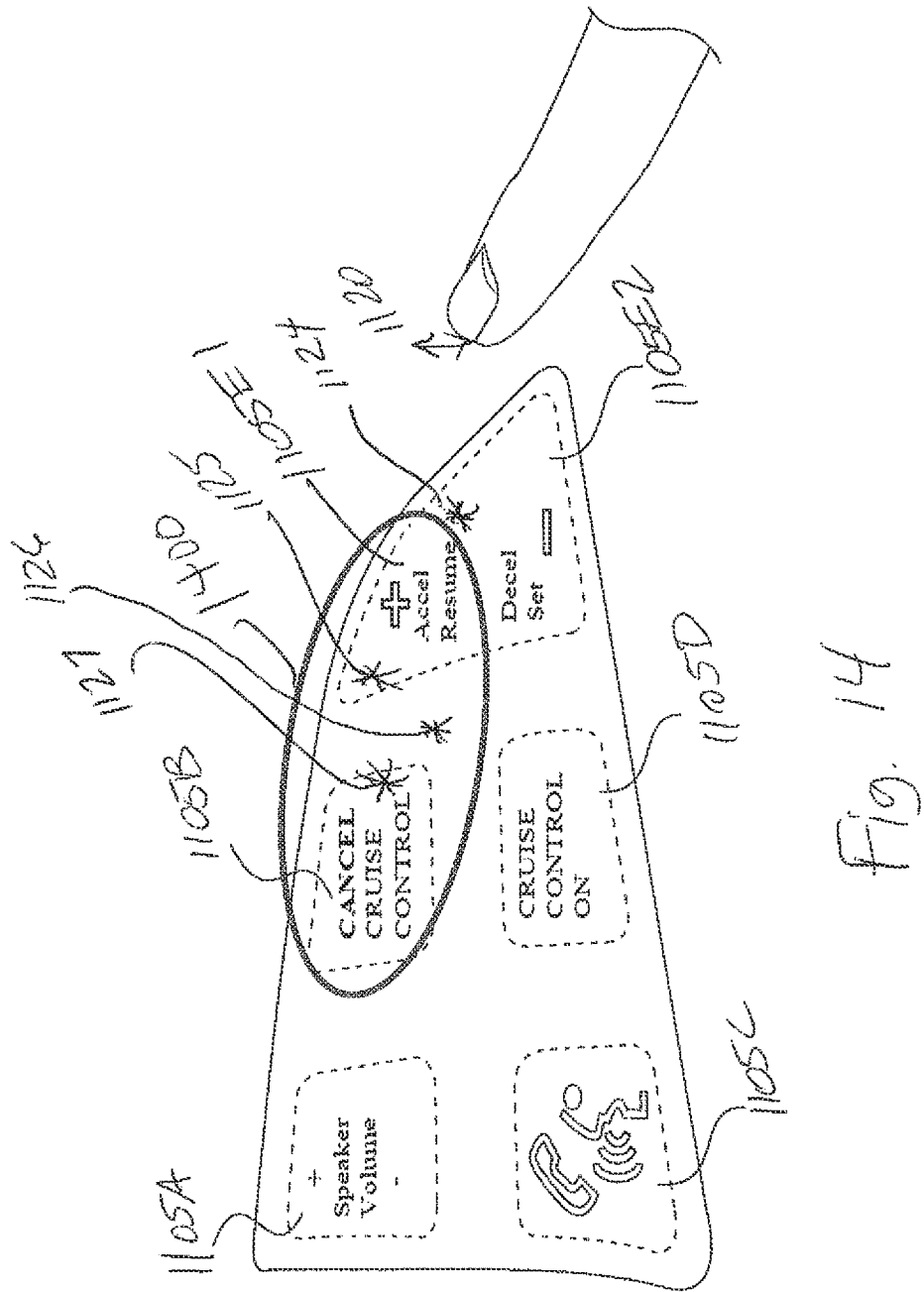
FIG. 14 illustrates an exemplary user-interface layout and corresponding virtual input area(s) as provided for in certain disclosed embodiments.

In one embodiment illustrated in FIG. 13, and without limiting this disclosure, so long as a first user interaction 1120 with the touch panel 120 provides the computer with a continuous force measurement (i.e., a touch that meets a force threshold requirement as discussed above), within a determined virtual input, the computer and associated software continue to update the effective position 1125 of subsequent user interactions (i.e., triangulating an effective position 1125 from sequential or simultaneous touches) with or on the user interface 120. Updating the effective position 1125 of the user interaction may be completed by calculating a series of coordinates in the virtual coordinate space using the force measurements, wherein the effective position 1125 moves within the map as the average of the coordinates changes with the force measurements. The computer calculates the effective position 1125 and an updated effective position 1126 by calculating average coordinates using the force measurements. In some embodiments, the average coordinates are x and y coordinates corresponding to the map of the user interface and z coordinates corresponding to an average force at the x and y locations.

In the example of FIG. 13, two virtual input areas 1105A and 1105C are in a pre-programmed relationship in the computer memory, with an area that implements an automated virtual attendant implemented with virtual input area 1105A having priority over a speaker volume function within virtual input area 1105C. In this non-limiting example, the speaker volume button is initially registered as active due to a touch event leading to the first effective position 1124 being within the command area. As shown in FIG. 13, the virtual input areas nearby may have either priority or non-priority relationships with each other. For example, virtual input area 1105A which activates a virtual attendant for voice commands, including emergency voice commands seeking help, would have priority over virtual input area 1105C which is merely changing speaker volumes within a vehicle cabin. In this non-limiting example, after a first touch event 1120 establishes a first effective position 1124 and activates speaker control within virtual input area 1105C, the computer updates a working map of the user interface 1100 to expand the priority virtual input area 1105A to incorporate a larger activation region illustrated as expanded virtual input area 1300. Thereafter, the computer tracks touch events on the touch panel 120, and if the effective positions 1125, 1126 move into the expanded virtual input area 1300 (determined from a priority relationship with a certain virtual input area such as but not limited to virtual input area 1105A), the computer changes the status of the determined virtual input area 1105C, that was first touched, to disabled and locks an updated status of the expanded virtual input area 1300, mapped in an updated or working map of the user interface 1100, as active. In other words, when the determined virtual input area 1105C has been identified as receiving a continuous touch from a user, the method and system of this disclosure utilize tracking operations to determine updated effective positions 1125, 1126. If the effective position 1124, 1125, 1126 moves into the expanded virtual input area 1300 so long as the determined virtual input area has an active status, the method and system change the status of the determined virtual input area 1105C to disabled and lock an updated status of the expanded virtual input area 1300, that triggers the functions of priority virtual input area 1105 as active. In this way, any duplicate, simultaneous, or subsequent user touches 1120 may be interpreted by the computer and associated control systems to yield a pre-programmed and predictable result that takes the most cautious use of vehicle functions into account. The preprogrammed algorithms described herein allow for the system to implement a particular function associated with a currently active virtual input area, and the appropriate function will take into account both user instructions at the human-machine-interface and the safest version of the current map of the touch panel at the user interface.

The methods and systems described herein are also configured with appropriate algorithms to account for situations in which user interactions occur so long as the determined virtual input area 1105E1 has an active status, as shown in FIGS. 11-14. In other words, once a virtual input area 1105E1 has been locked as active, even if time passes before the next user interaction with the touch panel 120, the system may pick up the steps of tracking the effective positions 1124, 1125, 1126 of subsequent user interactions. A system for controlling a user interface in a vehicle, therefore, may include a computer having a processor and memory storing a map of the user interface in a virtual coordinate space, wherein the map divides the user interface 1100 into virtual input area(s) 1105A, 1105B, 1105C, 1105D, 1105E corresponding to functions implemented by the computer. A plurality of force sensors 420A, 420B, 420C are connected to the user interface and in electronic communication with the computer to transmit force measurements from forces applied to the user interface during user interactions, such as by touches 1120. The memory stores computer implemented instructions performing steps including, but not limited to, using the processor and the force measurements, calculating an effective position 1124, 1125, 1126 of a user interaction on the map of the user interface 1100 and determining the virtual input area 1105A, 1105B, 1105C, 1105D, 1105E1, and 1105E2 in which the effective position lies. Labeling the determined virtual input area with a priority button label or a non-priority button label relative to other virtual input area(s). For the priority button label, the embodiments of this disclosure use the computer to implement a respective function assigned to the determined virtual input area. For the non-priority button label, the embodiments would, optionally, be configured for locking a status of the determined virtual input area, such as for example, virtual input area 1105E1 as active, updating the map of the user interface 1100 with respective expanded virtual input area(s) 1400 for related virtual input area(s) that have priority over the determined virtual input area, and so long as the determined virtual input area 1105E1 has an active status, updating the effective position 1124, 1125 1126, 1127 of the user interaction with the user interface. If the effective position 1124, 1125, 1126, 1127 moves into an expanded virtual input area 1400 associated with an identified priority button label, then the system and method include changing the status of the determined virtual input area 1105E1 to disabled and locking an updated status of the expanded virtual input area 1400 as active, which in this non-limiting example, would cancel cruise control all together. It is noted herein, that in FIG. 14, the expanded virtual input area 1400, in certain cases, may be programmed to encompass areas that are actually within the original non-priority virtual input area 1105E1. As noted above, numerous storage mechanisms and data structures are available for the computer to access maps of the user interface and the virtual input areas and to store a database or other record of priority and non-priority relationships between corresponding or related virtual input areas or between a single virtual input area and respective other virtual input areas.

In another embodiment, a computer implemented method for identifying a priority input from multiple inputs applied simultaneously to a force-based touch interface includes receiving a first touch value 1124 associated with a first user interaction with a first area 1105E1 of a force-based user interface 1100, the first touch value including information indicative of an x,y location within the first area of the touch interface and a force amount in a z-direction of the first user interaction. The computer implements a method that includes checking a database stored on the computer to identify previously labeled priority or non-priority relationships between the first area 1105E1 and at least one additional area 1105B on the touch interface 1100. By using the above described map stored in the memory, the computer is configured to expand any identified additional area having a priority label relative to the first area. In one non-limiting example, this would include expanding priority virtual input area 1105B that cancels cruise control which is a priority function compared to virtual input area 1105E1 that accelerates the vehicle under cruise control. By receiving a second touch value 1125, 1126, 1127 the computer is electronically alerted to associate an effective position with the second user interaction because the second touch value includes information indicative of an x,y location on the touch interface and a force amount in a z-direction of the second user interaction, wherein the x,y location of the second user interaction 1125 with the touch interface is spaced apart from the x,y location of the first area 1105E1 of the touch interface 1100. In response to determining that the x,y location associated with the second touch value is within an expanded area 1200, 1300, 1400 having a priority label, and the first touch value has not been interrupted, the computer implements a function associated with the expanded area having a priority label. In one non-limiting embodiment, the computerized methods of this disclosure account for situations that are not as clear cut as priority versus non-priority relationships. In response to determining that the x, y location associated with the second touch value 1126 is either within the first virtual input area, i.e., 1105E1 or within a different area not corresponding to a relationship in the database, then the computer simply implements the function associated with the first touch value.

This disclosure covers numerous embodiments having combinations of the above described structures, hardware, steps, and algorithms. Updating maps of a touch panel 120 and/or a user interface 1100 allows for the embodiments of this disclosure to implement safety precautions by expanding the area of a touch panel 120 that is pre-programmed to initiate a priority function so that inadvertent or misplaced touches on the touch panel 120 are more likely to be captured by a priority touch area if a misplaced touch occurs. This allows the method and system of this disclosure to identify a priority input from multiple inputs applied simultaneously to a force-based user interface 1100.

In one embodiment, the system receives a first touch value associated with a first user interaction, such as touch 1120, within a first area of a force-based touch interface (i.e., user interface 1100), the first touch value including information indicative of an x,y location within the first area of the touch interface and a force amount in a z-direction of the first user interaction. The method and system embodiments then check a database 1205 stored on a computer 1210 to identify previously labeled priority or non-priority relationships between the first area and at least one additional area on the user interface 1100. Once an additional area is identified as a priority area (i.e., appearing in computer records as having a priority label relative to the first area), the embodiments expand that priority area on the touch interface (e.g., reference 1300 in FIG. 13). The method and system are configured to receive a second touch value associated with a second user interaction. The second touch value includes information indicative of an x,y location on the user interface 1100 and a force amount in a z-direction of the second user interaction, wherein the x,y location of the second user interaction with the user interface is spaced apart from the x,y location of the first area of the touch interface. In response to determining that the x, y location associated with the second touch value is within an expanded area 1300 having a priority label and the first touch value has not been interrupted, the method and system are configured for implementing a function associated with the expanded area having a priority label. It is noted that interrupting the first touch value essentially means that the user interaction with the touch interface has been removed all together or the force associated with a user interaction does not meet a threshold value to indicate a true touch event. In response to determining that the x, y location associated with the second touch value is either within the first area or within a different area not corresponding to a relationship in the database, then implementing a non-priority function associated with the first touch value.

Figure 15:
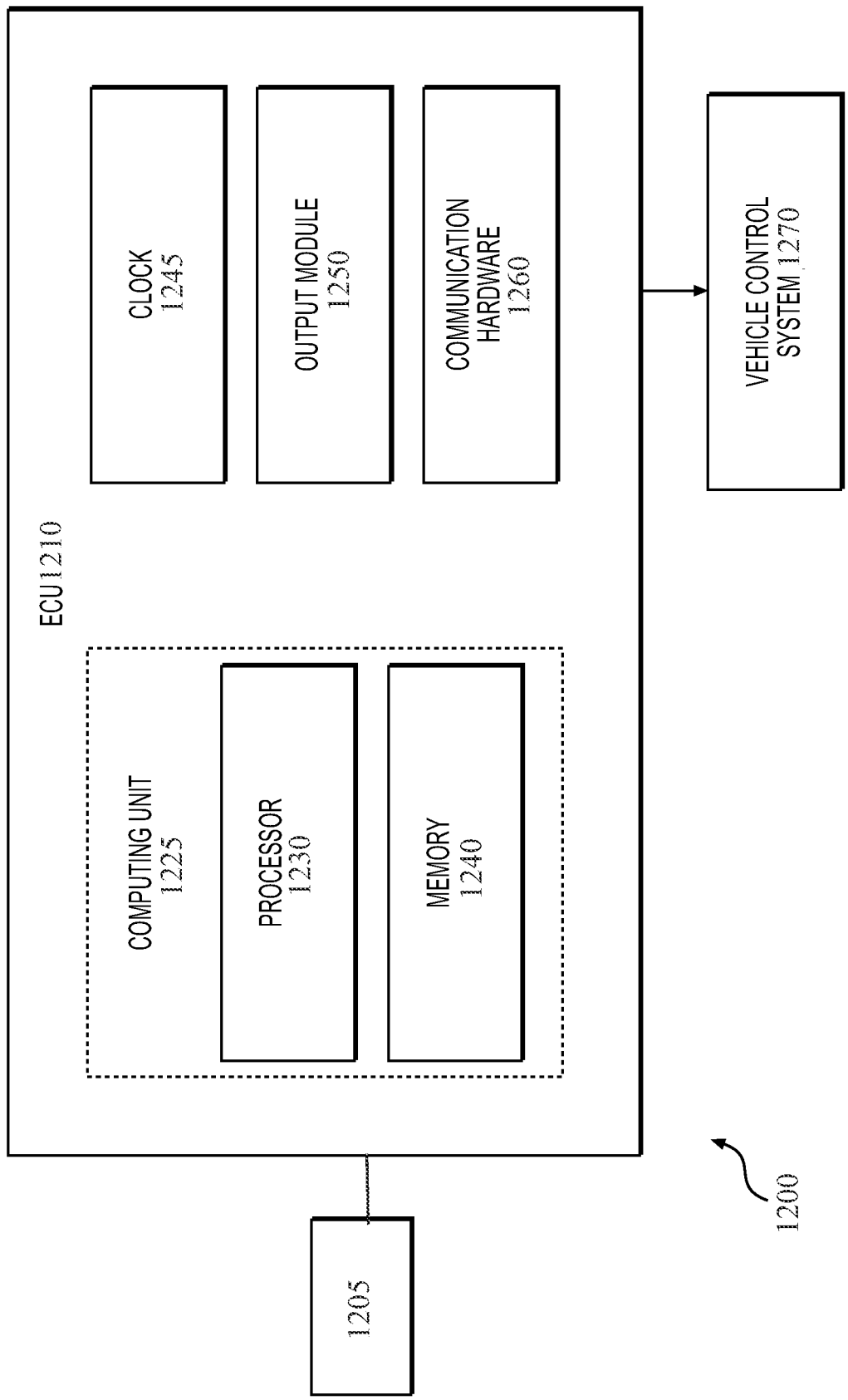
FIG. 15 illustrates a schematic of one computer and network environment in which the implementations of this disclosure may operate.

Implementations described above and in relation to FIGS. 1 through 14 may be used with equipment shown in FIG. 15 that implements computerized methods that are activated with an electronic control unit ("ECU") 1200 in electronic communication with a sensor 1205 as described herein. In particular, the described equipment, including imaging apparatuses and spectrometers, communicate with a computer processor configured to process one or more characteristics and/or profiles of the electrical signals received. By way of example and without limiting this disclosure to any particular hardware or software, FIG. 15 illustrates a block diagram of a system herein according to one implementation.

The ECU 1200 may include a computing unit 1225, a system clock 1245, an output module 1250 and communication hardware 1260. In its most basic form, the computing unit 1225 may include a processor 1230 and a system memory 1240. The processor 1230 may be a standard programmable processor that performs arithmetic and logic operations necessary for operation of the sensor system 1200. The processor 1230 may be configured to execute program code encoded in tangible, computer-readable media. For example, the processor 1230 may execute program code stored in the system memory 1240, which may be volatile or non-volatile memory. The system memory 1240 is only one example of tangible, computer-readable media. In one aspect, the computing unit 1225 can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processor 1230 the machine becomes an apparatus for practicing the disclosed subject matter.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the vehicle computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

It will be apparent to those skilled in the art that various modifications and variations can be made to the disclosed systems and methods for locking detected touch location in a force-based haptic multifunction switch panel. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

The invention claimed is:
1. A system for controlling a user interface in a vehicle, the system comprising:
   a computer comprising a processor and memory storing a map of the user interface in a virtual coordinate space, wherein the map divides the user interface into virtual input area(s) corresponding to functions implemented by the computer;
   a plurality of force sensors connected to the user interface and in electronic communication with the computer to transmit force measurements from forces applied to the user interface during a series of user interactions beginning with a first user interaction;
   wherein the memory stores computer implemented instructions performing steps comprising:
   using the processor and the force measurements, calculating an effective position of a user interaction on the map of the user interface;
   determining the virtual input area in which the effective position lies;
   labeling the determined virtual input area with a priority button label or a non-priority button label relative to other virtual input area(s);
   for the priority button label, using the computer to activate a respective function assigned to the determined virtual input area;
   for the non-priority button label:
      locking a status of the determined virtual input area as active;
      updating the map of the user interface by expanding a related virtual input area having priority over the determined virtual input area;

so long as the first user interaction comprises a continuous force measurement, updating the effective position of subsequent user interactions with the user interface;

if the effective position moves into the expanded virtual input area, changing the status of the determined virtual input area to disabled and locking an updated status of the expanded virtual input area as active.

2. The system of claim 1, further comprising for the priority button label, ignoring subsequent user interactions with other virtual input area(s) having a non-priority label until the respective function has been deactivated or completed.

3. The system of claim 1, further comprising, implementing a certain function associated with the active virtual input area.

4. The system of claim 1, further comprising updating the effective position of the user interaction by calculating a series of coordinates in the virtual coordinate space using the force measurements, wherein the effective position moves within the map as the average of the coordinates changes with the force measurements.

5. The system of claim 1, wherein the computer calculates the effective position and the updated effective position by calculating average coordinates using the force measurements.

6. The system of claim 5, wherein the average coordinates are x and y coordinates corresponding to the map of the user interface and z coordinates corresponding to an average force at the x and y locations.

7. The system of claim 1, wherein the continuous force measurement is above a threshold force value.

8. The system of claim 1, further comprising, implementing a certain function associated with the active virtual input area.

9. The system of claim 1, further comprising updating the effective position of the user interaction by calculating a series of coordinates in the virtual coordinate space using the force measurements, wherein the effective position moves within the map as the average of the coordinates changes with the force measurements.

10. The system of claim 1, wherein the computer calculates the effective position and the updated effective position by calculating average coordinates using the force measurements.

11. The system of claim 1, wherein the average coordinates are x and y coordinates corresponding to the map of the user interface and z coordinates corresponding to an average force at the x and y locations.

12. A system for controlling a user interface in a vehicle, the system comprising:
- a computer comprising a processor and memory storing a map of the user interface in a virtual coordinate space, wherein the map divides the user interface into virtual input area(s) corresponding to functions implemented by the computer;
- a plurality of force sensors connected to the user interface and in electronic communication with the computer to transmit force measurements from forces applied to the user interface during user interactions;
- wherein the memory stores computer implemented instructions performing steps comprising:
  - using the processor and the force measurements, calculating an effective position of a user interaction on the map of the user interface;
  - determining the virtual input area in which the effective position lies;
  - labeling the determined virtual input area with a priority button label or a non-priority button label relative to other virtual input area(s);
  - for the priority button label, using the computer to implement a respective function assigned to the determined virtual input area;
  - for the non-priority button label:
    - locking a status of the determined virtual input area as active;
    - updating the map of the user interface with respective expanded virtual input area(s) for related virtual input area(s) that have priority over the determined virtual input area;
    - so long as the determined virtual input area has an active status, updating the effective position of the user interaction with the user interface;
    - if the effective position moves into an expanded virtual input area associated with an identified priority button label, then changing the status of the determined virtual input area to disabled and locking an updated status of the expanded virtual input area as active.

13. A computer implemented method for selecting an active input area associated with a force-based touch interface divided into virtual input areas stored on a map in a computer, the method comprising:
- detecting a first touch value associated with a first user interaction within a first virtual input area of a touch interface, the first touch value including information indicative of an x, y location and a force amount in a z-direction of the first user interaction;
- labeling the first virtual input area as a priority area or a non-priority area;
- for a priority area, implementing a priority function and ignoring subsequent user interactions in corresponding non-priority areas;
- for a non-priority area, determining an associated priority area on the user interface and forming a virtually expanded priority area on the map of the user interface stored in the computer;
- so long as the first touch value has not been interrupted, for subsequent user interactions with the touch interface, updating an effective position of cumulative user interactions with the user interface;
- so long as the effective position remains within a labeled non-priority area, implementing an associated non-priority function;
- for any effective position within a labeled priority area, disabling the non-priority area and the associated non-priority function and locking the priority area and a priority function into an active status.

14. The computer implemented method of claim 13, wherein interrupting the first touch value comprises the user interaction with the touch interface being removed.

15. The computer implemented method of claim 13, further comprising forming the map of the user interface by storing, in the computer, respective x, y coordinates of discrete locations forming the user interface and grouping the x, y coordinates to define a plurality of virtual input areas on the touch interface.

16. The computer implemented method of claim 15, further comprising storing in a database priority and non-priority relationships between corresponding virtual input areas.

17. The computer implemented method of claim 16, further comprising establishing priority and non-priority relationships between respective pairs of corresponding virtual input areas.

18. The computer implemented method of claim 16, further comprising establishing a plurality of priority relationships with a single virtual input area.

19. A computer implemented method for identifying a priority input from multiple inputs applied simultaneously to a force-based touch interface, comprising:

receiving a first touch value associated with a first user interaction with a first area of a force-based touch interface, the first touch value including information indicative of an x,y location within the first area of the touch interface and a force amount in a z-direction of the first user interaction;

checking a database stored on a computer to identify previously labeled priority or non-priority relationships between the first area and at least one additional area on the touch interface;

expanding any identified additional area having a priority label relative to the first area;

receiving a second touch value associated with a second user interaction, the second touch value including information indicative of an x,y location on the touch interface and a force amount in a z-direction of the second user interaction, wherein the x,y location of the second user interaction with the touch interface is spaced apart from the x,y location of the first area of the touch interface;

in response to determining that the x,y location associated with the second touch value is within an expanded area having a priority label and the first touch value has not been interrupted, implementing a function associated with the expanded area having a priority label.

20. The computer implemented method of claim 19, further comprising, in response to determining that the x, y location associated with the second touch value is either within the first area or within a different area not corresponding to a relationship in the database, then implementing a non-priority function associated with the first touch value.

* * * * *